(12) United States Patent
Phillips et al.

(10) Patent No.: US 9,961,389 B2
(45) Date of Patent: May 1, 2018

(54) RECORDING DEVICE SPACE OPTIMIZATION IN A MULTICAST ADAPTIVE BITRATE (MABR) STREAMING NETWORK

(71) Applicant: Ericsson AB, Stockholm (SE)

(72) Inventors: Chris Phillips, Hartwell, GA (US); Jennifer Ann Reynolds, Duluth, GA (US)

(73) Assignee: ERICSSON AB, Stockholm (SE)

( * ) Notice: Subject to any disclaimer, the term of this patent is extended or adjusted under 35 U.S.C. 154(b) by 0 days. days.

(21) Appl. No.: 14/963,919

(22) Filed: Dec. 9, 2015

(65) Prior Publication Data

US 2017/0171589 A1 Jun. 15, 2017

(51) Int. Cl.

| | |
|---|---|
| *H04N 21/4147* | (2011.01) |
| *H04L 12/18* | (2006.01) |
| *H04N 21/6405* | (2011.01) |
| *H04N 21/61* | (2011.01) |
| *H04N 21/458* | (2011.01) |
| *H04N 21/262* | (2011.01) |
| *H04N 21/6543* | (2011.01) |
| *H04N 21/4335* | (2011.01) |
| *H04N 21/2662* | (2011.01) |
| *H04N 21/854* | (2011.01) |
| *H04N 21/845* | (2011.01) |
| *G11B 27/10* | (2006.01) |

(52) U.S. Cl.
CPC ......... *H04N 21/4147* (2013.01); *G11B 27/10* (2013.01); *H04L 12/18* (2013.01); *H04N 21/262* (2013.01); *H04N 21/2662* (2013.01); *H04N 21/4335* (2013.01); *H04N 21/458* (2013.01); *H04N 21/6125* (2013.01); *H04N 21/6405* (2013.01); *H04N 21/6543* (2013.01); *H04N 21/8456* (2013.01); *H04N 21/85406* (2013.01)

(58) Field of Classification Search
CPC .................................................. H04N 21/2662
See application file for complete search history.

(56) References Cited

U.S. PATENT DOCUMENTS

| | | | |
|---|---|---|---|
| 6,697,567 B1 | 2/2004 | Suzuki | |
| 2005/0238318 A1 | 10/2005 | Watanabe | |
| 2009/0144783 A1 | 6/2009 | Lee et al. | |
| 2010/0158101 A1 | 6/2010 | Wu et al. | |
| 2013/0312046 A1 | 11/2013 | Robertson et al. | |
| 2015/0163484 A1* | 6/2015 | Li ........................ | H04N 19/115 375/240.02 |
| 2015/0188963 A1 | 7/2015 | Bulava et al. | |

(Continued)

*Primary Examiner* — Olugbenga Idowu

(57) ABSTRACT

A system and method for managing recording quality and device space utilization in a multicast adaptive bitrate (MABR) streaming network. Using a subscriber recording schedule and available storage capacity, a DVR recording scheduler and optimization node is operative to determine a bitrate cap for one or more programs scheduled to be recorded at a default or target recording device. A multicast ABR video management agent is operative for joining, responsive to the bitrate cap information and other information provided via a multicast ABR bandwidth policy manager, the recording device to respective service channels corresponding to the one or more programs at select bitrate representations that maximize or optimize bitrate quality of recording subject to the bitrate cap information.

21 Claims, 20 Drawing Sheets

(56) References Cited

U.S. PATENT DOCUMENTS

2015/0288617 A1   10/2015   Dasher et al.
2015/0289003 A1   10/2015   Huber et al.
2015/0350704 A1*  12/2015   Horen ................ H04N 21/2393
                                              725/95

* cited by examiner

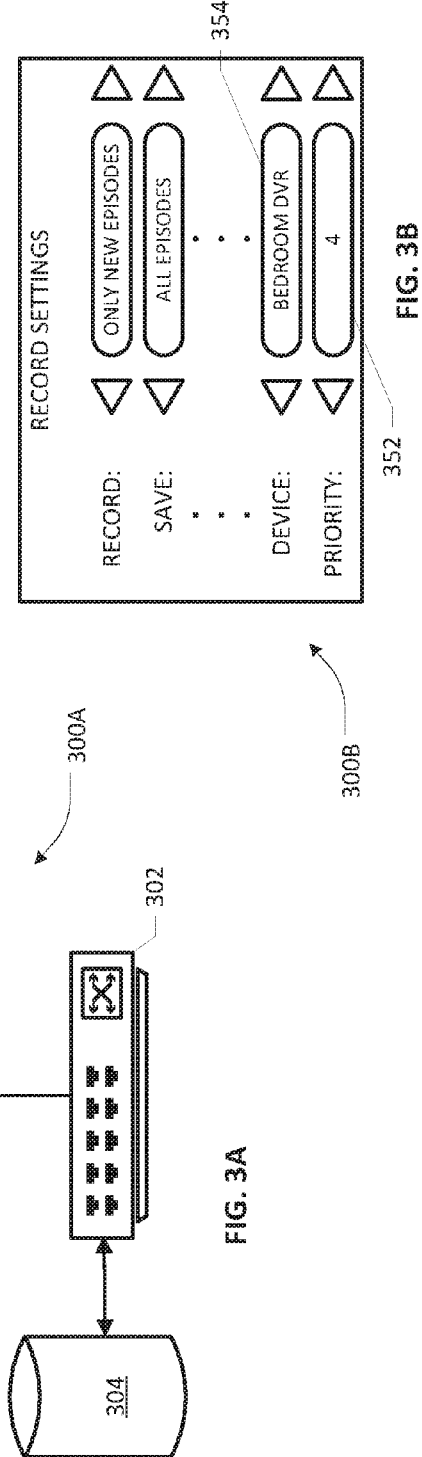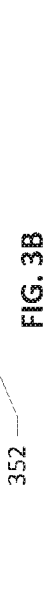
FIG. 3A
FIG. 3B

RECORDING DEVICE SPACE OPTIMIZATION IN A MULTICAST ADAPTIVE BITRATE (MABR) STREAMING NETWORK

FIELD OF THE DISCLOSURE

The present disclosure generally relates to communication networks. More particularly, and not by way of any limitation, the present disclosure is directed to a recording device space optimization system and method operative in a multicast adaptive bitrate (MABR) streaming network for recording MABR content.

BACKGROUND

The near universal adoption of Internet protocol (IP) as a standard for digital transmission is revolutionizing the traditional way of video delivery. Typical applications such as IPTV and live video streaming have become increasingly popular over the Internet. To efficiently utilize the bandwidth resources of the network in these applications, the video is usually compressed with suitable media coding schemes and then delivered only to subscribers who request it. For data delivery, multicast is considered the most efficient paradigm for such applications, but the scalability issue of traditional IP multicast continues to hinder the deployment of a large-scale video delivery system with numerous channels.

Consumers are increasingly expecting flexible behavior from their video services, including live multicast ABR content offerings via IPTV platforms, to enhance available viewing options and features. However, traditional multicast environments are largely unsuitable for providing a rich user experience. For example, recording live multicast ABR content poses specific challenges compared to recording traditional single-bitrate content because bitrates can vary in a multicast and different devices in the same multicast group can consume different bandwidths.

SUMMARY

Embodiments of the present patent disclosure are broadly directed to systems, methods, apparatuses, devices, and associated non-transitory computer-readable media for facilitating recording of live content in an MABR communications network. In one aspect, an embodiment of a system is disclosed for managing recording quality based on available storage space on a recording device disposed in a subscriber premises that is served by the MABR communications network. Using a subscriber recording schedule and available storage capacity, a DVR recording scheduler and optimization node is operative to determine a bitrate cap for one or more programs scheduled to be recorded at a default or target recording device. A multicast ABR video management agent is operative for joining, responsive to the bitrate cap information and other information provided via a multicast ABR bandwidth policy manager, the recording device to respective service channels corresponding to the one or more programs at select bitrate representations that maximize or optimize bitrate quality of recording subject to the bitrate cap information.

In another aspect, an embodiment of a method for managing recording quality in an MABR communications network is disclosed. In one arrangement, the method involves receiving one or more storage update messages from a client device disposed in a subscriber premises including one or more client devices, wherein the one or more storage update messages include information indicative of usage of a target recording device disposed in the subscriber premises. In another arrangement, the method involves receiving one or more record state messages from the client device that include information indicative of when a recording on the target recording device starts and stops. Using the record state information, initial storage capacity/consumption information, as well as MABR bitrates for recordings on the target recording device, appropriate service logic is configured to determine current storage statistics relevant to the target recording device. Responsive to a client schedule for programs to be recorded at the target recording device, a determination is made as to available storage space on the target recording device for recording one or more programs scheduled over a Look Ahead (LA) period with respect to a client recording schedule. Based on the available storage space, a bitrate cap may be determined for recording the one or more programs over the LA period. A bitrate cap request message with a suitable indicator (e.g., whether there is a bitrate cap to be applied or not) may be provided to a multicast ABR policy manager for facilitating joining of the target recording device by an MVMA node to respective service channels corresponding to the one or more programs at bandwidth allocations that maximize or optimize select bitrate representations of the recorded channels.

In another aspect, an embodiment of an apparatus for managing recording quality in an MABR communications network is disclosed. The claimed embodiment comprises, inter alia, a segmentation and gapping (SAG) unit configured to receive a plurality of encoded MABR streams for each service channel from an MABR encoder operative to receive a plurality of service channels or source feeds, wherein each encoded MABR stream corresponds to a particular bitrate representation of a specific service channel. The SAG unit is further operative to generate a segmented and gapped MABR stream for each encoded MABR stream of each service channel. A digital video recorder (DVR) scheduler and optimization (DSO) module or element is configured to provide program recording schedules to a client device disposed in a subscriber premises including one or more client devices, the program recording schedules comprising an electronic program guide showing a plurality of programs available on a set of MABR service channels serving the subscriber premises. The DSO module, element or subsystem is further configured to receive (i) one or more storage update messages from a client device disposed in a subscriber premises including one or more client devices, wherein the one or more storage update messages include information indicative of usage of a target recording device disposed in the subscriber premises, and/or one or more record state messages from the client device disposed in the subscriber premises, the one or more record state messages including information indicative of when a recording on the target recording device starts and stops. Responsive to a client schedule for programs to be recorded at the target recording device, the DSO element is configured to determine available storage space on the target recording device for recording one or more programs scheduled over a Look Ahead (LA) period with respect to the client's recording schedule. Based on the available storage space, a bitrate cap is determined for recording the one or more programs over the LA period, which is provided via a bitrate cap request message to a multicast ABR policy manager to indicate whether a bitrate filter is applicable with respect to the one or more programs to be recorded at the target recording device. An MVMA node or element coupled to the multicast ABR policy manager is operative to receive the bitrate cap indication as well as one or more messages relative to bandwidth allocation policy information with respect to a subscriber premises bandwidth pipe serving the subscriber premises. Responsive to the received information as well as applicable MABR bitrates for all services, the MVMA node is configured to join the target recording device to respective service channels corresponding to the one or more programs at select bitrate representations that maximize or optimize bandwidth allocated to the recorded channels, thereby advantageously managing recording bitrate quality of the one or more programs at the target recording device.

In one variation, an MVMA embodiment may be provided as a virtual machine running on a host platform disposed in the network. In another variation, the MVMA element may be co-located at a subscriber premises gateway node. In a still further variation, one or more components of an apparatus or system set forth herein may be provided in a distributed cloud-based architecture involving one or more layers of virtualized environments instantiated on commercial off the shelf (COTS) hardware.

In still further aspects, one or more embodiments of a non-transitory computer-readable medium containing computer-executable program instructions or code portions stored thereon are disclosed for performing one or more embodiments of the methods set forth herein when executed by a processor entity of a network node, premises gateway node, MABR bandwidth/QoS policy manager, DVR recording scheduler, or in a virtualized environment instantiated on a host machine. Additional features of the various embodiments are as claimed in the dependent claims.

Without limitation, advantages of one or more embodiments of the present invention are set forth in the context of the following. Recording live MABR content has specific challenges compared to traditional single-bitrate content due, at least in part, to unpredictable bitrate changes in a network that can result in unpredictable file sizes. Thus, it becomes nearly impossible for standard PVR systems to predict if there is enough file space remaining to record a show or a program. Additionally, since bitrates can vary, some devices in the same network will have a higher priority for bandwidth, with higher priority devices taking more of the bandwidth and getting better video QoS while the lower priority devices getting a lower QoS. Furthermore, it should be appreciated that in an MABR network, setting priority of a DVR at the device level will result in that device always consuming the bandwidth based on its device level priority, which defeats individualizing users' viewing/recording preferences. Benefits of the present invention include, but not limited to, the ability to cap the bitrates of recorded streams either at a fixed cap or at a level that will allow an entire program to be stored on a target recording device. Accordingly, at least certain embodiments herein advantageously overcome the foregoing issues by facilitating storage space optimization, whereby enriched user experiences may be achieved across various channels, multicast device groups as well as users. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIGS. 3A-3C depict example user interface embodiments at a subscriber device for facilitating one or more program recording requests as well as notifications relative to recording device space utilization in an example an MABR communications network arrangement of FIG. 1A or FIG. 1B;

DETAILED DESCRIPTION OF THE DRAWINGS

Figure 1A:
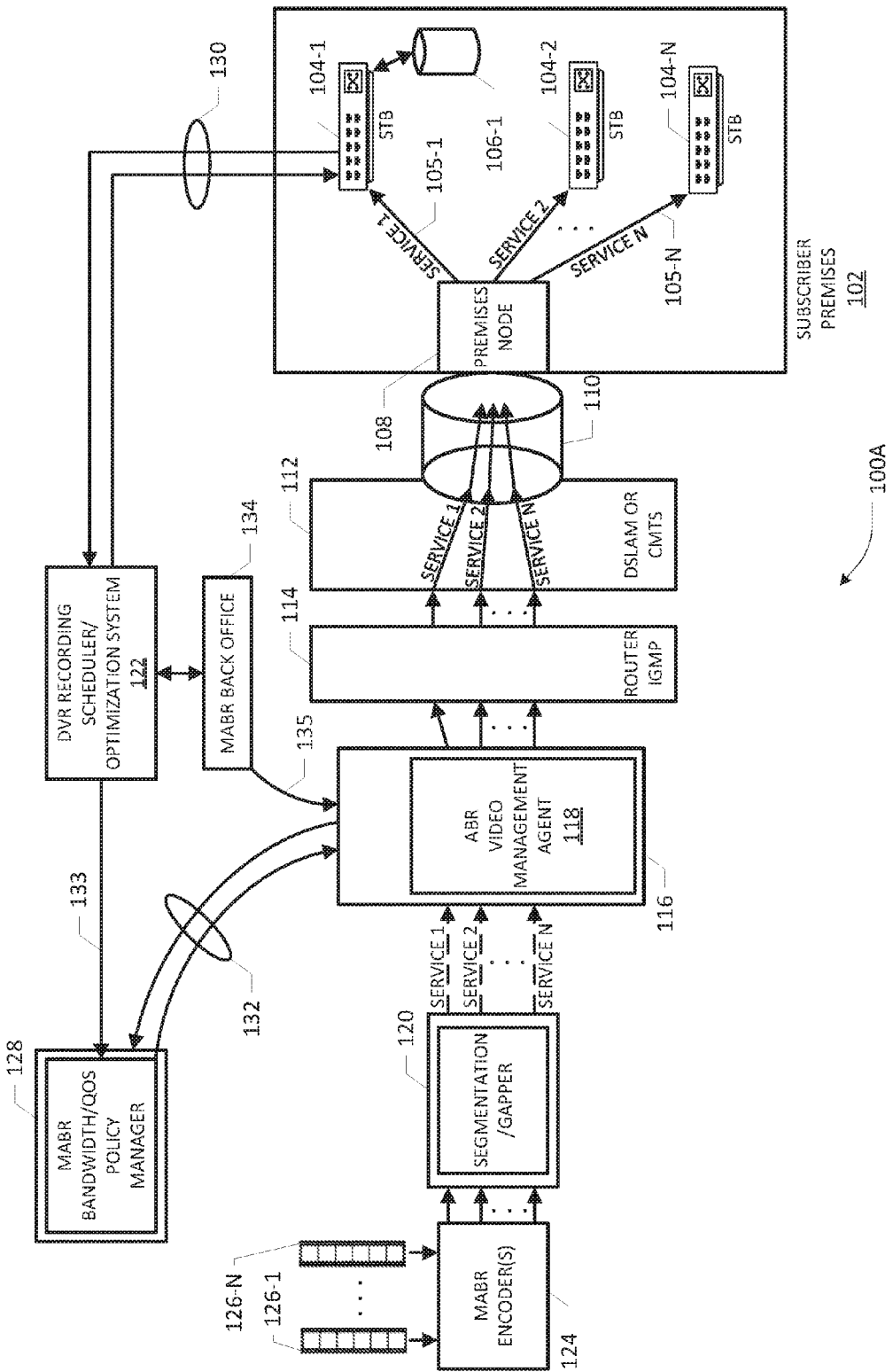
FIG. 1A depicts an example MABR communications network arrangement including a DVR recording scheduler and space optimization subsystem wherein one or more embodiments of the present patent application may be practiced for managing recording quality of program content and space utilization at a recording device disposed in a subscriber premises.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. As such, some network elements may be disposed in a wireless radio network environment whereas other network elements may be disposed in a public packet-switched network infrastructure, including or otherwise involving suitable content delivery network (CDN) infrastructure. Accordingly, some network elements may comprise "multiple services network elements" that provide support for multiple network-based functions (e.g., A/V media delivery policy management, session control and session resource management, Quality of Service (QoS) policy enforcement, bandwidth scheduling management, subscriber/device policy and profile management, content provider priority policy management, streaming policy management, and the like), in addition to providing support for multiple application services (e.g., data and multimedia applications). Example subscriber end stations or client devices may comprise devices configured to tune to multicast service channels that may comprise content delivered via a multicast ABR communications network as well as progressive download ABR clients, HTTP clients, and the like, for receiving content from one or more content providers, e.g., via a broadband access network. Broadly, such client devices may therefore include traditional or managed set-top boxes (STBs) with or without integrated cable cards, or with or without internal storage devices, connected/smart TVs, OTT STBs, standalone personal/digital video recorders (PVR/DVRs) or other mass media storage/recording devices, networked media projectors, portable laptops, netbooks, palm tops, tablets, phablets, smartphones, mobile/wireless user equipment, portable media players, portable gaming systems or consoles (such as the Wii®, Play Station 3®, etc.), and the like, which may access or consume content/services provided via a suitable delivery pipe provisioned for a subscriber premises (e.g., a home, office, or other facility), including program content channels (also referred to as service channels) delivered in a suitable MABR network architecture for purposes of one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1A, depicted therein is an example MABR communications network environment 100A wherein one or more embodiments of the present patent application may be practiced for facilitating recording of MABR program content and managing recording device space utilization at a recording device disposed in a subscriber premises 102. In the context of the present disclosure, the MABR communications network environment 100A may implemented as an end-to-end network architecture for delivering MABR media content (and advertisement content, where applicable) using any delivery infrastructures, e.g., a Digital Subscriber Line (DSL) architecture, a Data Over Cable Service Interface Specification (DOCSIS)-compliant Cable Modem Termination System (CMTS) architecture, a suitable satellite access architecture or a broadband wireless access architecture. By way of example and introduction, MABR streaming delivery is broadly set forth herein that is applicable to both DSL and DOCSIS architectures without necessarily being limited thereto. As will be seen below, content may be delivered using either multicast ABR techniques or unicast ABR techniques. In a unicast delivery, a subscribing receiver may be provided with a direct and unique two-way path through the delivery network all the way back to a serving media server supplying the required data stream. The main streaming activity is managed on a one-to-one basis between the receiver and the source server in a communication session. The network between the source server and receiver may typically comprise a series of intermediate servers installed at network nodes, which may not be directly involved in the service but only support the transfer of a packet stream. Typically, the protocols used to support the transmissions are simple forms of Internet Protocol (IP) itself augmented by one or more higher layer protocols to provide flow control. These protocols extend across the span of the network connection between the source server and a given receiver.

A unicast system can support ABR streaming, which allows some form of rate adaptation. A given service may be encoded at a selection of different bitrates (known as representations), with synchronised boundary points at defined locations (e.g., every 50 frames). For each representation, content between successive boundary points is converted into a discrete file. Clients fetch a segment of one of the representations in turn. If a higher or a lower bit rate is required, the next segment is fetched from one of the other representations. The segments are constructed such that there is no discontinuity in decoded pictures/audio if the client switches between representations at the boundary points. This system may require a unicast two-way path between source and receiver to request files and deliver the requested files.

Multicast delivery makes more efficient use of bandwidth by sharing content streams among several receivers, wherein the content may be provided with or without rate adaptation. Intermediate network elements (e.g., routers or switches) are now more closely involved in the service delivery such that some control and management functions are delegated from the source server. This control is supported by more extensive protocols devised for this type of application such as, e.g., Protocol Independent Multicast (PIM) and Internet Group Multicast Protocol (IGMP). When a receiver requests a given media item, the network router system finds an existing stream of that content already in the network and directs a copy of it to that receiver from a serving cable headend, a video head office or an appropriately proximal network node in an edge distribution network. The requesting receiver may be provided with the capability to join this existing stream under controlled conditions that do not adversely affect existing receivers. Any receiver in this group may also be provided with the ability to leave the stream, or pause its consumption, without affecting the others. Additionally, there may be an implementation where a video pipe delivering services to a premises is operative to deliver content to one or more progressive download clients of the premises that are designed to receive the video in bursts.

Subscriber premises 102, which is served by a suitable broadband pipe 110, is illustratively shown in FIG. 1A as having a plurality of client devices 104-1 to 104-N, some of which may consume multicast content and/or effectuate one or more program recording requests resulting in a client recording schedule for purposes of an embodiment of the present patent application, wherein one or more client devices may comprise STBs respectively coupled to or otherwise integrated with at least one display device (not specifically shown) and/or associated DVR/PVR or some other internal storage for recording programming content. For purposes of the present patent application, the terms "DVR", "PVR", or "mass media storage", or other terms of similar import may be somewhat interchangeably used, and may be broadly referred to as a target recording device, regardless of whether such recording device is integrated with a client device (e.g., STB) operative to launch a graphic user interface to display an Electronic Program Guide (EPG) for facilitating user selection of a program on a particular service channel for recording. Accordingly, the client devices 104-1 to 104N may include STBs, standalone DVRs, or other standalone recording/storage devices, provided as part of a premises network disposed in the subscriber premises 102. As the MABR program content may be encoded using different encoding schemes (i.e., source encoding), the client devices may be configured to operate with one or more coder-decoder (codec) functionalities based on known or hereto unknown standards or specifications including but not limited to, e.g., Moving Pictures Expert Group (MPEG) codecs (MPEG, MPEG-2, MPEG-4, etc.), H.264 codec, High Efficiency Video Coding or HEVC (H.265) codec, and the like, in order to receive and render various types of programming content that is delivered as a plurality of service channels. Further, in certain implementations, subscriber premises 102 may also include one or more progressive download clients such as, e.g., smartphones, computers, gaming devices or consoles, OTT STBs or tablets, etc., not specifically shown in FIG. 1A.

As noted, a premises network (not explicitly shown) may be disposed in the premises 102 for inter-operatively connecting the client devices 104-1 to 104-N to a suitable premises node or element 108 such as a DSL router/gateway or a cable modem that is operative to effectuate communications (including bearer and signaling traffic) with respect to the client devices of the premises. Regardless of the exact composition of the client devices, including any standalone recording devices, such a premises network, which may be implemented using any suitable wireless or wireline network technologies, may therefore comprise network paths or pipes 105-1 to 105-N for streaming service channel content to respective client devices, including the program content selected for recording, whose bandwidth allocations may be modulated or managed in accordance with the teachings herein. Although not specifically shown in FIG. 1A, it should be appreciated that premises 102 may also include other devices that may consume bandwidth for other data and voice communications as previously noted. Accordingly, the total bandwidth of subscriber premises pipe 110 may be apportioned between or allocated to a virtual video pipe for streaming of managed service channels, a shared video pipe portion for servicing progressive download clients if present (i.e., progressive ABR download pipe), in addition to data and voice pipes. Furthermore, as will be set forth in detail further below, a portion of the managed video pipe may be dynamically allocated to program content selected for recording, which bandwidth allocation may be modulated based on recording device space constraints in accordance with certain embodiments of the present invention.

In an example implementation, subscriber premises 102 may be served via an access network architected over DSL infrastructure or DOCSIS-compliant CMTS infrastructure. Accordingly, the subscriber premises bandwidth pipe 110 may be disposed between subscriber premises node 108 and an access node 112 such as a DSL Access Multiplexer (DSLAM) node or a CMTS node. A suitable IGMP switch or router 114 (e.g., IGMPv2/v3-capable Gigabit Ethernet (GigE) multicast router) is coupled to the access node 112 for effectuating suitable IGMP Leave/Join messages, in conjunction with additional functionalities or structures set forth in detail further below, with respect to joining, leaving or changing various multicast streams, including program channels selected for recording, corresponding to the service channels available to client devices 104-1 to 104-N of the subscriber premises 102.

One or more ABR encoders 124, which may be provided as part of a multicast stream formation (MSF) functionality in one example embodiment, are operative to receive a plurality of channel source feeds 126-1 to 126-N corresponding to a group of service channels that may be provided as MABR channels having segmented streams at different bitrate representations as will be described in detail below. Typically, the ABR encoder 124 receives live feeds from appropriate communications networks, although it is possible in an alternative or additional arrangement for a file-based streamer to read the content files from a disk and stream the content streams via a network to the ABR encoder 124. Accordingly, the channel source feeds may comprise a variety of content or programs, e.g., pay TV broadcast programs delivered via cable networks or satellite networks, free-to-air satellite TV shows, IPTV programs, time-shifted TV (TSTV) content, and the like. Regardless of how channel source feeds are generated and provided to the ABR encoder 124, a segmentation and gapping (SAG) unit 120 is configured to receive a plurality of encoded MABR streams for each service channel from the MABR encoder 124. As noted, each encoded MABR stream corresponds to a particular bitrate representation (e.g., 10 Mbs to 500 Kbs that correspond to various levels of video quality or resolutions) of a specific service channel to which a subscriber station may tune for watching or a channel on which a particular program has been selected for recording. SAG element 120 is operative to generate a segmented and gapped MABR stream for each encoded MABR stream of each service channel in a gapping functionality that may also be provided as part of an MSF module or node set forth further below.

In accordance with the teachings of the present invention, a DVR recording scheduling and space optimization (DSO) node, subsystem or element 122 is disposed in the MABR communications network environment 100A that is operative to interface with one or more client devices of the premises 102, e.g., via interface 130, in order to facilitate communications relative to providing or receiving programming information or schedules, program recording requests, storage/recording device space utilization statistics, as well as for providing suitable warnings or notification messages to the clients where the recording device(s) space may be constrained for recording a selected one or more programs of a client recording schedule. Accordingly, in one implementation, the DSO node 122 may be configured to provide one or more program/recording schedules to a client device, e.g., device 104-1, via a suitable path forming the interface 130, wherein the program/recording schedules may comprise information for an Electronic Program Guide (EPG) that is displayable on a display device associated with the client device 104-1. By way of illustration, an example EPG may be provided as or via an interactive graphical user interface that shows a plurality of programs available on a set of MABR service channels serving the subscriber premises, including program start times and dates, program ending times, as well as other indicia related to the programs. Furthermore, in another implementation, DSO element 122 may also be configured to receive one or more program recording requests from the client device 104-1 via a suitable path of the interface 130, wherein the program recording requests may include selections to record particular programs on corresponding service channels as well as respective recording timing information, e.g., start time/date, stop time/date, etc. In a still further embodiment, program recording requests from the client device may also include indications of one or more target recording devices and/or default recording devices of the subscriber premises on which recording of one or more programs is to take place. For example, the recording may take place at the scheduled time on a DVR integrated or otherwise associated with the client device from which the program recording requests are generated, or on a standalone mass media storage device of the premised network, or on a DVR integrated or otherwise associated with another client device. By way of illustration, whereas reference numeral 106-1 refers to a storage or DVR device associated with the client device 104-1, additional DVRs as well as one or more standalone premises network storage devices may also be provided as part of the subscriber premises 102 in FIG. 1A. In one example implementation, an illustrative program recording request or associated message from the client device 104-1 may therefore take on a form shown below:

Scheduled Program Recording
Subscriber ID: <sid>
Device ID: <did>
Channel ID: <channel id>
Start Date: <mm/dd/yyyy>
Start Time: <hh:mm:ss>
End Date: <mm/dd/yyyy>
End Time: <hh:mm:ss>

In accordance with further teachings of the present invention, messages including information relative to storage statistics may be generated toward DSO element 122 from a client device, e.g., device 104-1, with respect to a storage device associated therewith, e.g., DVR 106-1, and/or any other storage devices of the subscriber premises 102. Depending on implementation, such storage statistics may be provided periodically and/or triggered based on configurable event triggers (e.g., a program recording request either scheduled for a future recording or activating a record button for immediate recording of a program, etc.), wherein the messaging may be effectuated based on any number of techniques such as pushing, pulling or polling and the like.

By way of illustration, an example storage statistics message with respect to a DVR may take on a form shown below:
 DVR Storage Statistics
 Subscriber ID: <sid>
 Device ID: <did>
 Total Capacity: 536870912000
 Used: 486945878943

Additionally, DSO element 122 is further configured to maintain a recording schedules database (not shown in FIG. 1A), which may be organized on per user, client or subscriber basis, including target recording device indications (e.g., per device) in certain embodiments. A MABR back office node or element 134 is operative to provide a list of MABR service channels as well as all the MABR bitrates supported in the network 100A. As will be described in further detail below, DSO element 122 is operative responsive to, inter alia, the storage utilization statistics, client recording schedules, etc., to determine available storage space on a target or default recording device for recording one or more programs scheduled over a configurable Look Ahead (LA) period of the client recording schedule and provide suitable messaging via interface 133 to a multicast ABR bandwidth/QoS policy manager node, element or subsystem 128 to indicate, e.g., in a bitrate cap request, whether a bitrate cap or filter is applicable with respect to one or more programs to be recorded at the target or default recording device over at least a portion of the LA period. By way of illustration, an example bitrate cap request message may take on a form shown below:
 Bitrate Cap Request
 Subscriber ID: <sid>
 Device ID: <did>
 Bitrate: <br>

Responsive thereto, the MABR bandwidth/QoS policy manager 128 is configured to provide one or more messages to a multicast ABR video management agent (MVMA) node, element or subsystem 118 via an interface 132, wherein the one or more messages preferably include at least one of the bitrate filter indication information and bandwidth policy information with respect to the subscriber premises bandwidth pipe 110 serving the subscriber premises 102. In one embodiment, an example message may comprise a bitrate cap request message identical to or based on the bitrate cap request message received from DSO element 122 exemplified above. Responsive to the received information, MVMA 118 is operative for effectuating channel joining, channel changing and recording of the selected programs at suitable bitrate streams or representations as will be set forth hereinbelow, wherein the target or default recording device may be joined (e.g., via using IGMP Join operations) to respective service channels corresponding to the one or more programs at select bitrate representations that maximize bitrate quality of recording of the one or more programs within the bitrate bounds that may be applied to the subscriber pipe's bandwidth allocation based on available storage space statistics.

In one implementation, the multicast ABR bandwidth policy manager 128 may be configured to generate one or more messages to the MABR video management agent (MVMA) 118 with suitable information, e.g., as push-based messages at a scheduled triggering events, that includes but not limited to device-based bandwidth allocation policies, program-based bandwidth allocation policies, pipe management policies, bitrate cap information, recording bandwidth allocations, etc. Such messages may be triggered based on suitable times relevant to the recording time information of the client schedules as per program recording requests from the subscriber/client devices in the MABR network environment, for instance, and may be provided via interface 132 to MVMA 118. In addition, the MABR back office node or element 134 is also coupled to MVMA 118 via an interface 135 for providing information regarding all multicast services as well as corresponding MABR bitrates for each service supported in the network 100A, similar to the MABR information provided to DSO 122. According to the teachings of the present invention, MVMA 118 is operative responsive to the bandwidth allocation/update messages and the bitrate cap or filter information from the multicast ABR bandwidth policy manager 128 for joining of various service channels being provided to the subscriber premises, including program streams selected for recording on one or more target recording devices at appropriate bitrate representations of the service channels based on channel packing techniques applied to the subscriber premises bandwidth pipe. As part of channel joining operations, MVMA 118 may therefore be configured to receive the segmented and gapped MABR streams for each service channel from SAG 120, join and de-gap the MABR streams at select bitrate representations for transmission downstream to the premises 102 via IGMP router 114 and DSLAM/CMTS 112.

Depending on implementation, one arrangement may involve providing the MVMA functionality at a location upstream from IGMP router 114. Further, in such an arrangement (also referred to as "network agent implementation"), the MVMA functionality may be provided as a virtual machine function (i.e., in a virtualized environment running on a physical/hardware platform) instantiated at a network node or element. In an alternative arrangement, the MVMA functionality may be provided at the premises gateway (also referred to as "gateway agent implementation"). In a still further arrangement, the MVMA functionality may be provided in a cloud or at a CDN edge node. Regardless of where it is implemented, the MVMA functionality has the overall responsibility for joining multicast service channels, including channels whose programs have been selected for recording as part of a client recording schedule, at appropriate timing reference points, and having suitable bitrate representations in order to effectuate subscriber pipe bandwidth management in an optimal manner subject to the recording device space utilization constraints.

One skilled in the art will recognize that a network agent implementation is illustrated in FIG. 1A, wherein a service node 116 having the MVMA functionality 118 is disposed north of IGMP router 114 (i.e., toward the network core). Accordingly, in this implementation, de-gapped multicast streams for the service channels at select bitrates are passed through the IGMP router 114, access node 112, and ultimately to the client devices via the premises node 108. In the arrangement shown in FIG. 1B, an example MABR communications network environment 100B is illustrative of a gateway agent implementation, wherein a premises node 152 includes appropriate MVMA service logic or module 153 for performing the de-gapping and joining operations. This architecture allows for de-gapping multicast streams at the last possible moment, but requires segmented and gapped MABR streams in select multiple bitrate representations to be traversed through IGMP router 114 and access node 112, all the way to the premises node 152.

Figure 14:
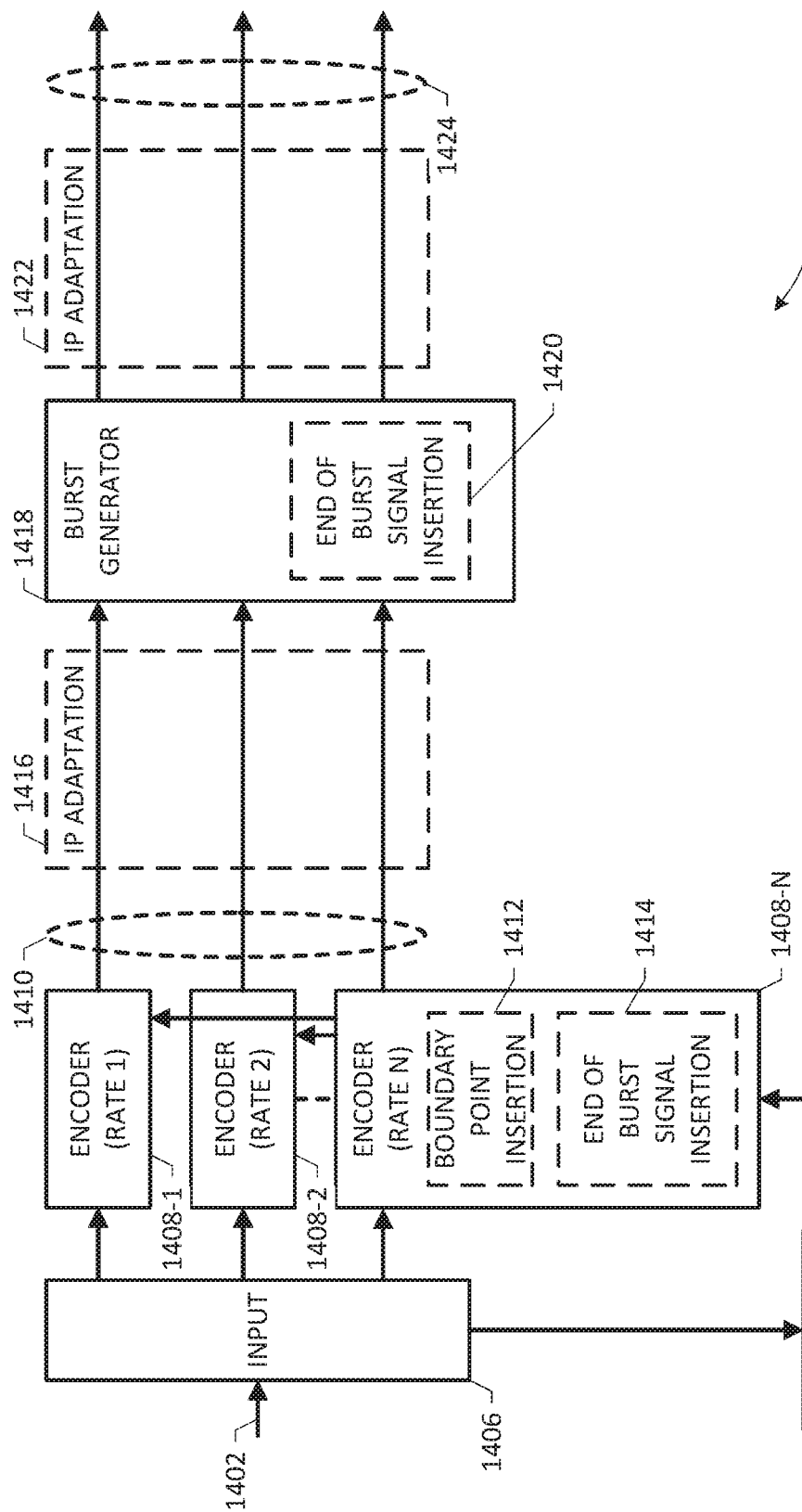
FIG. 14 depicts a block diagram of an apparatus for segmenting media/content channels according to an embodiment of the present patent application.

Regardless of where an example MVMA node is implemented, it is required to receive segmented/gapped MABR streams corresponding to the multicast service channels from SAG functionality 120. Furthermore, SAG functionality 120 and encoder functionality 124 may be combined into an MSF functionality as noted above. Attention is now directed to FIG. 14 that depicts a block diagram of an apparatus 1400 operative as a multicast ABR encoder and gapper for segmenting or packaging content channels according to an embodiment of the present patent application. Apparatus 1400 is advantageously configured for creating a set of segmented stream representations and forming bursts with respect to a media service, which segmented streams may be provided with suitable inter-segment gaps that allow channel operations such as channel joining, channel leaving, switching, splicing in or splicing out, channel (re)multiplexing, de-gapping, etc. as part of downstream operations (e.g., at MVMA functionality 118, IGMP switch 114, and/or MVMA functionality 153). In an example implementation, apparatus 1300 may receive an input feed 1402 of content per service (e.g., corresponding to any of channel source feeds 126-1 to 126-N in FIG. 1A or FIG. 1B) at an input block 1406 that fans the feed to a plurality of encoders/transcoders 1408-1 to 1408-N, which generate, in parallel, a set of representations of the content at different bitrates. The representations can differ in video resolution depending on the bitrate of encoding. A timing generator 1404 outputs a signal that determines the boundary point of the segments. For example, this functionality may output a signal once per 50 frames (2 seconds), or at any other suitable time interval. The signal output by generator 1304 is applied to all of the parallel encoders 1408-1 to 1408-N for that service. Advantageously, the set of coders 1408-1 to 1408-N can close a Group of Pictures (GOP) and a boundary point insertion unit 1412 can insert in-band signaling such as a Random Access Point (RAP) and a Boundary Point (BP). The outputs of the set of coders 1408-1 to 1408-N are the set of representations 1410 which have time-aligned and/or frame-aligned segments. The representations 1410 are applied to a burst generator unit 1418 that creates the bursts separated by window periods (e.g., on the order of tens or hundreds of milliseconds). In operation, unit 1418 may be configured to play out data at a higher bit rate than the bit rate at which data was received to create the bursts and is operative to recognize the start and end of segments in the representations 1410 by detecting suitable signaling markers (e.g. the in-band BP signaling inserted by the encoders).

Multicast address information may be added at an IP adaptation stage, which can occur at a network node hosting the MVMA functionality or at a node further downstream. Multicast IP datagrams have a destination IP address that is set to be in a range reserved for multicast. In FIG. 14, reference numeral 1424 refers to a bundle of IP-addressed streams generated by the apparatus 1400. It should be appreciated that the apparatus shown in FIG. 14 can operate on data at one of various possible levels. In one advantageous scheme, data may be encoded into Transport Stream (TS) packets at a normal rate and the burst generator unit 1418 operates on TS packets. Transport Stream packets can be adapted into IP packets before burst generator unit 1418 at adaptation block 1416, or after unit 1418 at adaptation block 1422. Another alternative is to form bursts before any packetization (at TS or IP level), but this may be less desirable.

FIG. 14 further illustrates several possible places where end of burst signaling can be added. Each encoder 1408-1 to 1408-N can include an end of burst signal insertion unit 1414 that adds an information element indicating the end of a burst into the encoded data, which includes a header of the TS packets. Alternatively, the burst generator unit 1418 can include an end of burst signal insertion unit 1420 arranged to insert an information element indicating the end of a burst into each of the bursts. Where end of burst signaling is provided as a multicast (with same or different address), the multicast can be generated at the edge network node.

Figure 1B:
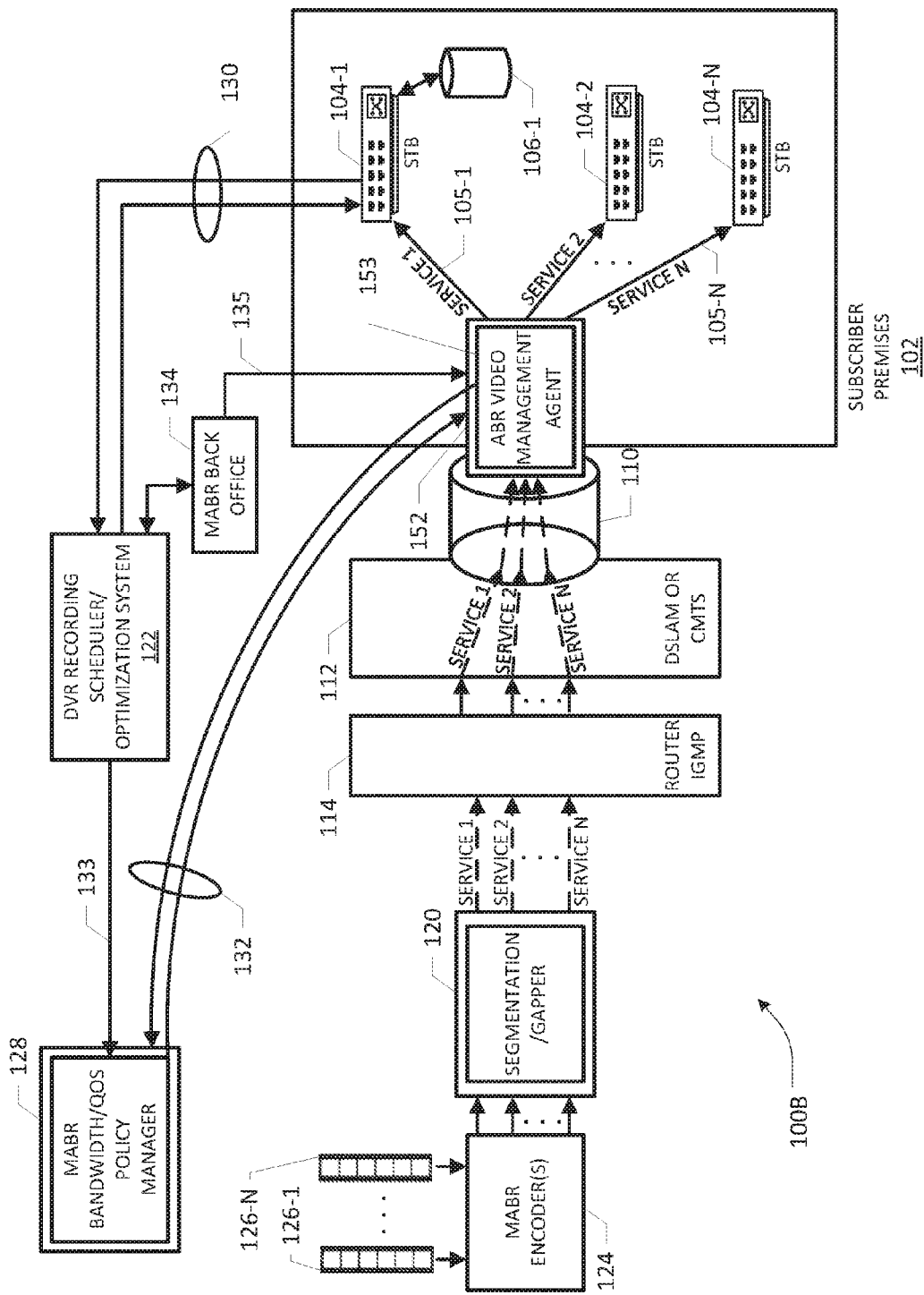
FIG. 1B depicts another example MABR communications network arrangement including a DVR recording scheduler and space optimization subsystem wherein one or more embodiments of the present patent application may be practiced for managing recording quality of program content and space utilization at a recording device disposed in a subscriber premises.

Typically, a network operator may receive a media content service feed from a service provider, which may then be converted to streams or channels having the right characteristics for the edge distribution network and end users of the network. Although FIG. 14 shows a set of encoders/ transcoders 1408-1 to 1408-N configured to operate upon an input data stream 1302 to form the multiple representations at different bitrates, such a stage may be bypassed where a set of representations at different bitrates already exist (e.g., by way of a separate encoder 124 as shown in FIGS. 1A and 1B). Accordingly, it should be understood that multiple representations for a media content service channel can be generated at a point of origin into the MABR communications network or could be supplied by a service provider, wherein the multiple representations can include various quality definitions, e.g., Standard Definition (SD), High Definition (HD), Ultra HD, etc., of the same content. A skilled artisan will recognize that the duration of the window period (e.g., 200 to 300 milliseconds or thereabouts) introduced in a segmented stream is of sufficient magnitude for a multicast receiver to leave one representation of the stream and join a different representation at a different bitrate or an entirely different media stream, at appropriate timing reference points, e.g., stream access points (SAPs), which may be accomplished by issuing appropriate IGMP Leave and Join messages.

A potential consequence of adding window periods or gaps to the transmitted streams is that the flow of content may become jittered beyond the level that normal packet transmission produces. This can be accommodated by buffering provided within an intermediary reception apparatus, e.g., MVMA functionality 118. The window period duration will influence the amount of jitter produced and so there is an optimum size that is related to the worst-case response times of the chain of routers/servers delivering the content. This time is taken for switches to recognize and implement all those steps that are required to keep the stream flowing, including the potential need for the multicast content to be found at or near the source server. For segment durations of the order of about 2 seconds, a possible value of the window period is around 330 milliseconds. The window size is a function of the responsiveness of the network to support multicast Leave and Join functions and it will be appreciated that the window period can be modified to a higher or lower value. More generally, the window period could have a value selected from the range of 0.1 ms and 10 seconds and, more advantageously, the range 10 ms-350 ms. As switches and routers increase in performance, it is possible that the window duration can be reduced to the lower end of the ranges stated above. In one implementation of the MVMA functionality, a 300 ms gap and suitable buffering may allow MVMA 118 (or MVMA 153 in a gateway agent implementation) to perform IGMP Leave and Join operations for seamless switching of regular multicast service channel content with respect to channel tuning/change requests as well as tuning to appropriate service channels at scheduled recording times as per requests from client devices. Whereas the segmented/gapped MABR streams for various service channels are received at receive ports of the MVMA node with multicast addresses changing on the fly, the downstream port addresses are fixed, corresponding the various service channels, to which IGMP Join operations are ultimately propagated from the subscriber stations. Additional details regarding multicast segmented stream formation and channel joining/leaving techniques may be found in commonly owned PCT Application No. PCT/EP2012/070960, titled "A METHOD AND APPARATUS FOR DISTRIBUTING A MEDIA CONTENT SERVICE", filed Oct. 23, 2012, in the name(s) of Anthony Richard Jones, now published as WO2014/063726, incorporated by reference herein.

Figure 2:
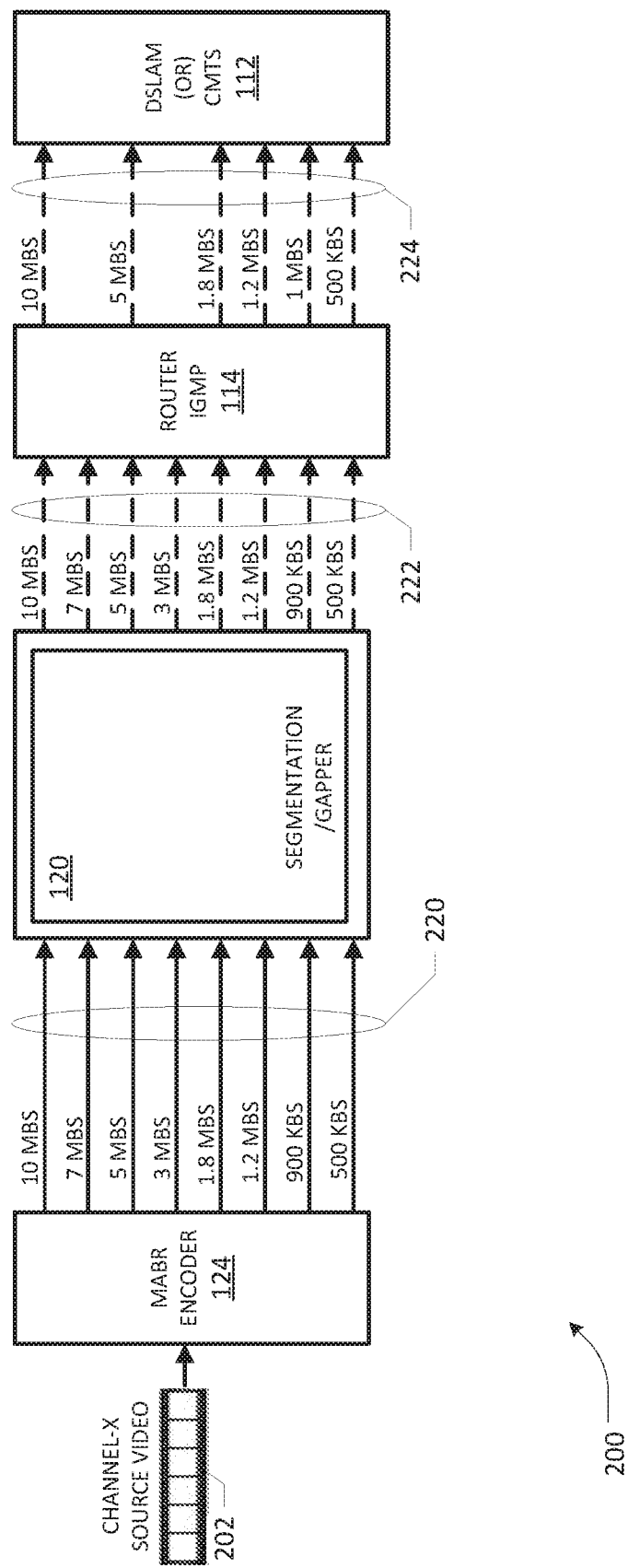
FIG. 2 depicts a network portion or subsystem that may be arranged as at least part of an apparatus for facilitating recording of content in an MABR communications network arrangement of FIG. 1A or FIG. 1B according to one embodiment.

FIG. 2 depicts a network portion or subsystem 200 that may be arranged as at least part of an apparatus for facilitating recording of content in an MABR communications network arrangement of FIG. 1A or FIG. 1B according to one embodiment. In particular, subsystem 200 shows further details of an example implementation of SAG functionality 120 that is operative to generate a set of gapped streams (e.g., having ~300 ms gaps between SAPs of two segments (i.e., inter-SAP gap)) with respect to a particular service channel feed 202 that may be tuned to for recording, real-time watching, or both, by a user operating a client device of the subscriber premises 102, wherein the channel feed 202 is illustrative of the service channels 126-1 to 126-N shown in FIGS. 1A and 1B. Consistent with the description above, the channel feed 202 may be received by MABR encoder/transcoder 124 for generating a plurality of encoded (and unsegmented) streams encoded at, e.g., 10 Mbs to 500 Kbs (i.e., multiple bitrate representations) as exemplified by reference numeral 220, which may be processed as corresponding segmented streams 222 by the segmenter/packager 120.

In one embodiment, SAG 120 may be configured to transmit all possible bitrates for services that are identified as multicast services to the next element downstream as per the standard multicast operations. Where the MVMA functionality is embodied in a network agent implementation, it is typically the downstream recipient of the regular multicast gapped/segmented streams 222 with respect to each service channel. In a gateway agent implementation, such streams are provided to the IGMP router 114, as shown in the illustrative arrangement of FIG. 2, wherein the IGMP router 114 may pass along streams for only those channels that are active, as shown by example downstream bundle 224 propagating towards DSLAM/CMTS node 112 (and ultimately to the premises gateway node's MVMA functionality, which joins the client device to the de-gapped stream having the right bitrate representation). As will be described below, the MVMA functionality is modulated based on, inter alia, messages provided by MABR bandwidth/QoS policy manager 128 responsive to the bitrate cap information received from the DVR scheduler/optimization subsystem 122.

Figure 3C:
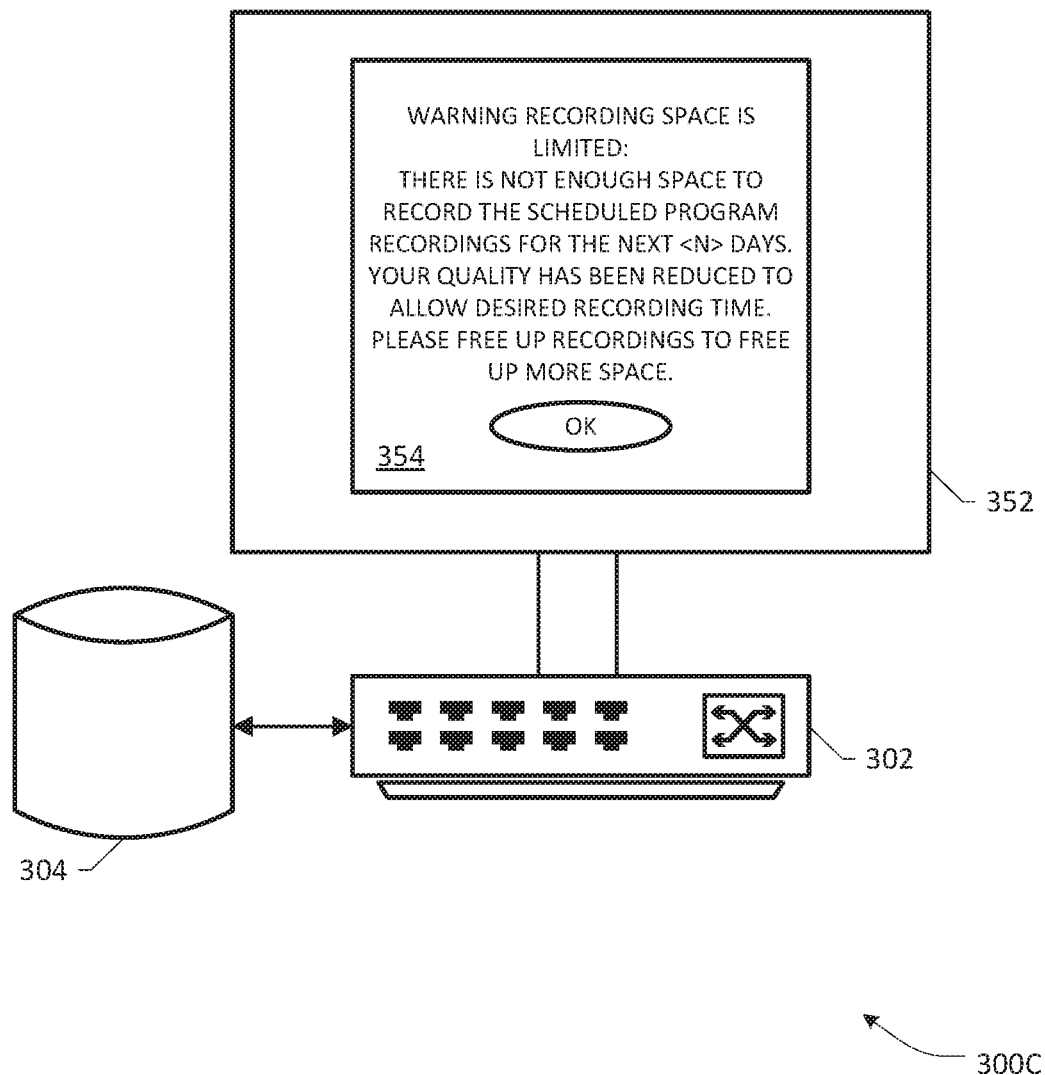

FIGS. 3A-3C depict example user interface embodiments at a subscriber device for facilitating one or more program recording requests as well as notifications relative to recording device space utilization in an example an MABR communications network arrangement of FIG. 1A or FIG. 1B. In particular, FIG. 3A depicts an example user interface associated with an EPG or schedule 300A that may be launched at a client device 302 for facilitating one or more program recording requests in an example an MABR communications network arrangement of FIG. 1A or FIG. 1B according to one embodiment. It should be appreciated that EPG 300A may be launched by operating a traditional remote control device suitably modified in accordance with practicing an embodiment of the present invention. In another implementation, an EPG interface may be provided or generated using other types of client devices as well, e.g., laptops, tablets, smartphones, etc., which may be provided with suitable "apps" for launching multicast IPTV/video services. Regardless of the specific implementation, EPG interface 300A may include programming information for various channels 304, including timing information 306, program titles 308, etc., that may be provided in a scrollable grid. In one configuration, when a user selects a particular program 310 for recording, a pull-down menu or dialog box 300B may be provided as an overlay menu window or as a separate interface for presenting and/or setting a plurality of options relative to recording the selected program. In an additional embodiment, a priority option 352 is operative for setting or selecting a specific recording priority level that is indicative, illustrative or otherwise representative of a video quality preference (e.g., SD, HD, UHD, etc.) that may be applied in a subscriber pipe's bandwidth allocation plan for recording. Another option 354, which may be referred to as a recording device option, is operative for setting or selecting a target recording device of the subscriber premises on which the particular program is to be recorded. It will be apparent to one skilled in the art that such options may be configured in numerous ways, e.g., with drop-down sub-menus, dialog boxes, clickable icons, and the like. Furthermore, where Digital Rights Management (DRM) constraints or other restrictions with respect to the program may be implemented, appropriate paywall portals etc. may be presented at any level of the interface 300A and/or recording settings menu 300B. Additional details regarding setting priority levels for recording different programs, which may be practiced in combination with one or more embodiments set forth in the present patent application, may be found in the following commonly owned U.S. patent application entitled: "RECORDING MULTICAST ADAPTIVE BITRATE (MABR) STREAMING CONTENT BASED ON SCHEDULE", (Ericsson Ref. No.: P47853-US1), application Ser. No. 14/963,871, filed even date herewith, in the name(s) of Christopher Phillips et al., incorporated by reference herein.

In one configuration, a default target recording device may be provided, which may comprise an DVR or other storage associated or otherwise integrated with the client device 302, wherein the default setting may be over-writable or reconfigurable. In another configuration, a networked storage may be provided as the target recording device, either in a default setting or otherwise. Reference numeral 304 in FIG. 3A refers to a recording device that is broadly illustrative of all such target recording device variations and configurations operative for practicing an embodiment of the present invention. FIG. 3C depicts an example UI interface 354 illustrating a suitable notification, warning or alert that may be presented or displayed at display device 352 coupled to the client device 302, which notifications may be provided by DSO system 122 and may include a message to the viewer that there is not enough space on a target or default recording device, e.g., recording device 304, with respect to recording one or more programs of the client recording schedule over a certain period of time. Additional or alternative embodiments of notifications may include further information and/or instructions indicating that video quality of the recordings may be reduced, additional space requirements, options to free up more space, selecting a different target recording device, etc. One skilled in the art will recognize such notifications and alerts may be implemented in a number of ways depending on the client device configurations and display capabilities, including audio/graphical icon representations and the like.

Figure 4A:
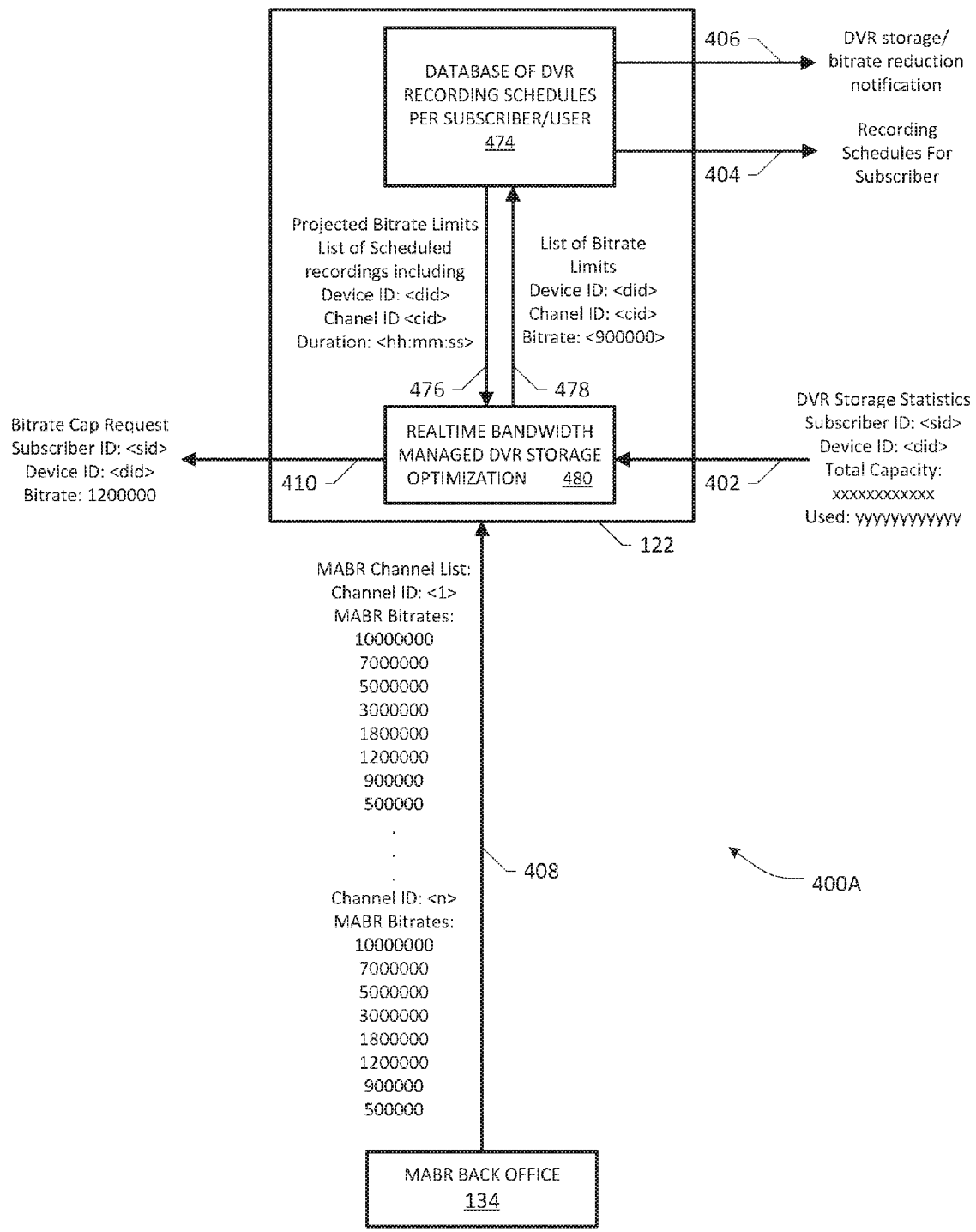
FIGS. 4A and 4B are block diagrams involving network nodes or elements operative in an example MABR a network portion or subsystem that may be arranged as at least part of an apparatus for facilitating recording of content based on bitrate cap determinations in an MABR communications network arrangement of FIG. 1A or FIG. 1B according to one embodiment.
Figure 4B:
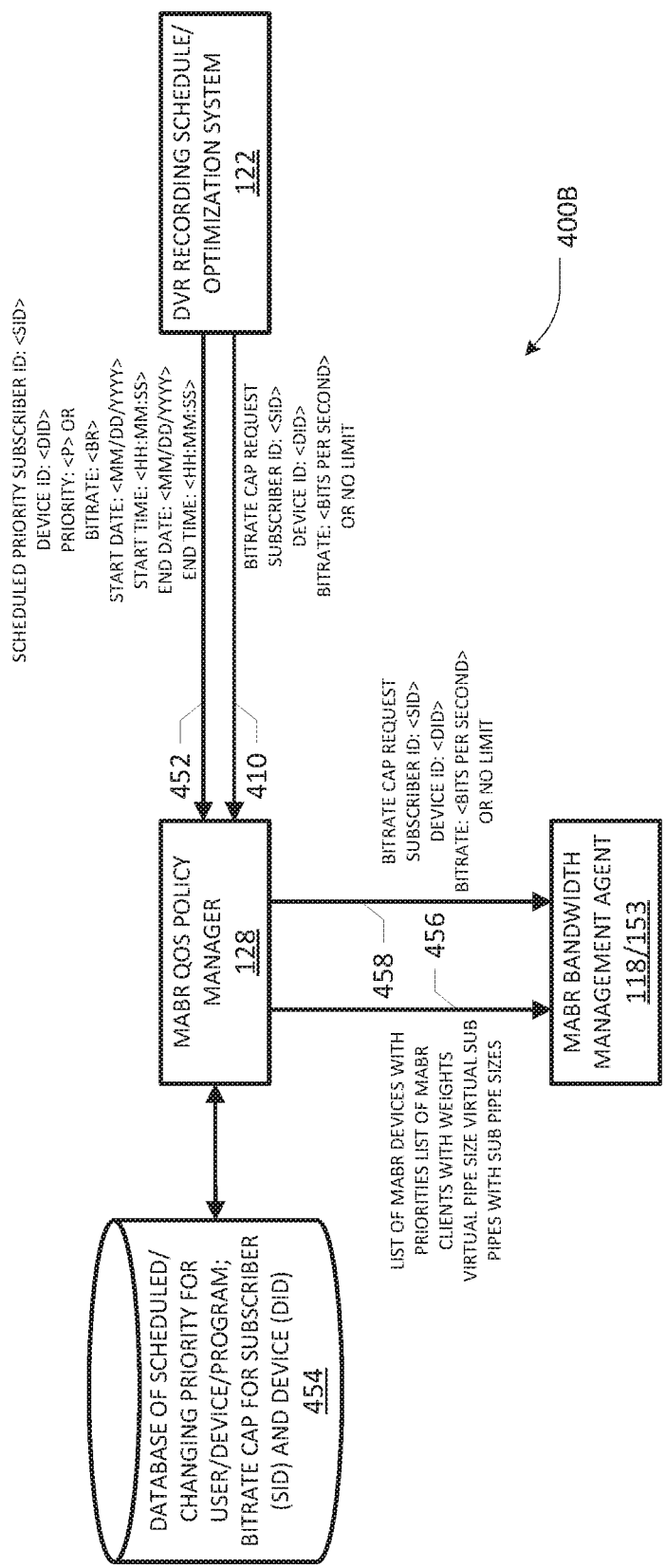

FIGS. 4A and 4B are block diagrams involving network nodes or elements operative in an example MABR a network portion or subsystem that may be arranged as at least part of an apparatus 400A/400B for facilitating recording of content based on bitrate cap determinations in an MABR communications network arrangement of FIG. 1A or FIG.

1B according to an embodiment. Apparatus 400A of FIG. 4A depicts additional details in an example implementation of an DVR recording scheduler/optimization node, e.g., DSO 122, with example message flows or interfaces with other nodes or elements described above. A real-time bandwidth managed DSO functionality or module 480, which may be implemented using suitable hardware and software (e.g., a processor configured to execute appropriate program instructions or code responsive to the message flow information) may be interfaced with a database 474 of recording schedules per subscriber or user, as well as on a recording device basis in certain further implementations. As noted previously, DSO subsystem 122 is interfaced with MABR back office 134 for receiving a channel list and applicable MABR bitrates on a message interface 408. Likewise, recording device storage statistics may be received from the client devices via a message interface 402. Whereas message interfaces 404 and 406 are operative with respect to providing program/recording schedules and storage space related notifications, respectively, to the subscriber client devices, as described above, message interfaces 476, 478 are internal to the DSO system with respect to passing the MABR bitrate information and projected bitrate limits with respect to the target recording device and service channels corresponding to one or more programs of the client recording schedules.

Broadly, the overall functionality of DSO system 122 involves determining a maximum bitrate it can allow based on recording device settings (including e.g., available space, future recordings, etc.). The MABR back office 134 is operative to let DSO system know what MABR bitrates are available, so it can choose a bitrate not above the maximum bitrate it can handle. It communicates this cap to the MABR policy manager via messaging interface 410, which uses this cap to make real-time bandwidth decisions (e.g., modifying the bitrate to any of the possible bitrates below the cap), which may be communicated to MVMA 118/153 as a bitrate cap request via a suitable messaging interface (shown in FIG. 4B). It should be noted that the MVMA functionality itself is in charge of standard MABR practices (such as controlling the IGMP joins of multicasts to decide what multicast feed makes it to the subscriber premises). An alternative arrangement may involve providing only the storage available for a particular recording transmitted throughout the network, rather than total capacity and used capacity metrics of a recording device.

In one example embodiment of the invention, therefore, various modules of the apparatus 400A/400B may use information obtained from the client device and the MABR bitrates available (e.g., from the MABR back office) to choose a maximum (capped) bitrate for a recording based on the additional information comprising when the recording is scheduled, how much storage space is available for the recording and providing the bitrate cap information to the MABR bandwidth/QoS policy manager 128. Since the service logic executing on the apparatus 400A/400B has access to all future recordings (e.g., at MABR database 454 and/or recording schedule database 474), it can make complex decisions based on future database usage. It should be noted that while some pieces of the information may mostly be passed through to MVMA 118/153, database 454 may be configured to save various capped bitrates with respect to the client recording schedules. In a further arrangement, the MABR bandwidth/QoS policy manager 128 may also be configured to keep track of changing bitrate caps as well as priorities depending on changes to client recording schedules, real-time storage utilization metrics from the client devices, etc. In a still further arrangement, both recording priority levels as well as device-based priorities or weights may be used in bandwidth allocation techniques in order to manage the subscriber pipe's bandwidth via suitable IGMP Join/Leave operations subject to the bitrate cap limits. It should be noted that various message interfaces shown in FIGS. 4A and 4B are exemplary of the interfaces illustrated in FIG. 1A or 1B, e.g., message interfaces 402, 404 and 406 representing interface 130, message interfaces 456/458 representing interface 132 and message interfaces 410, 452 representing interface 133, according to an illustrative embodiment of an apparatus or network portion for purposes of the present invention.

Figure 5:
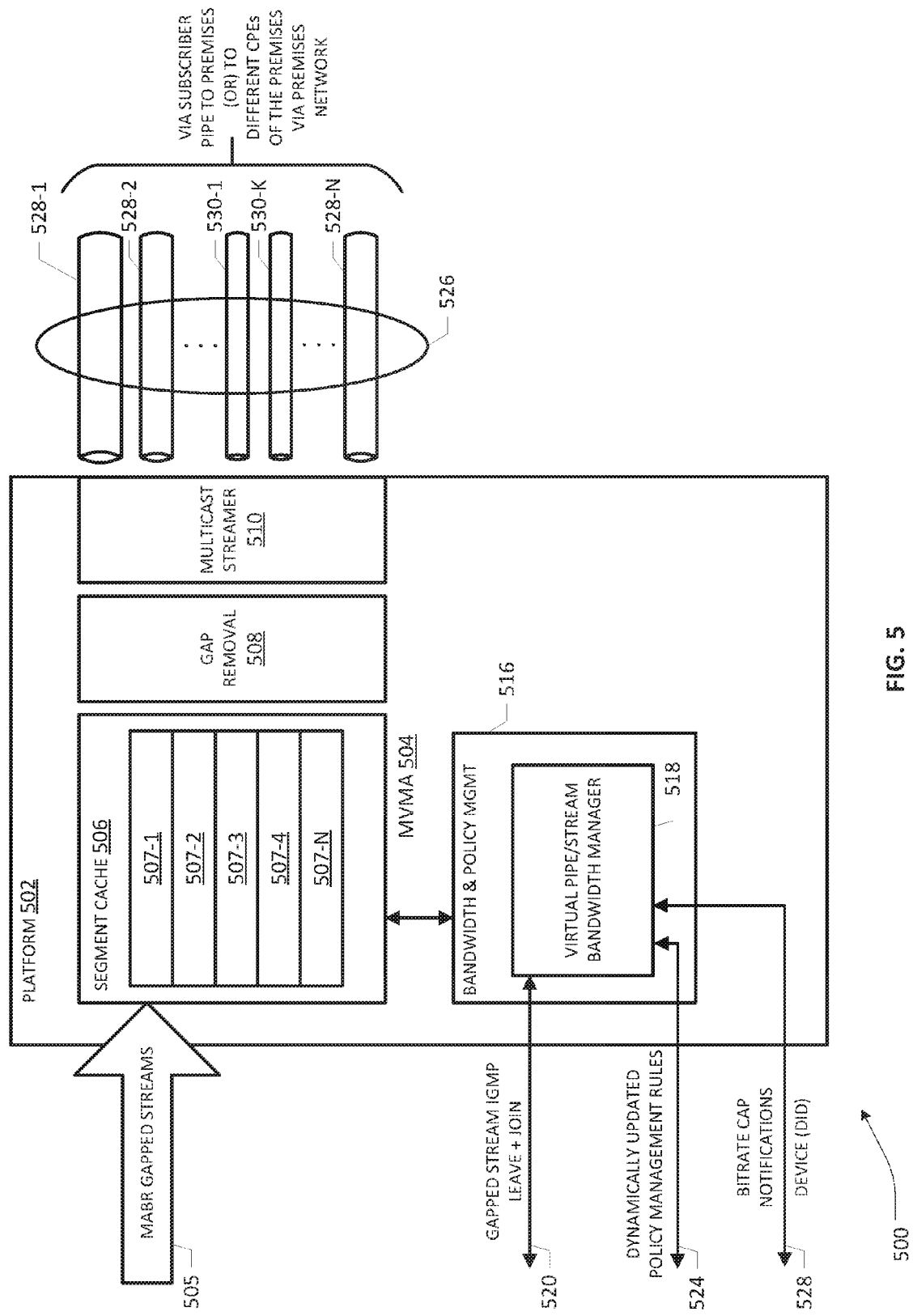
FIG. 5 is a block diagram of a video management agent operative in an example MABR communications network arrangement of FIG. 1A or FIG. 1B according to one embodiment.

FIG. 5 is a block diagram of a node, element, apparatus or subsystem 500 operative in an example an MABR communications network arrangement of FIG. 1A or FIG. 1B according to one embodiment, wherein an MABR video management agent or functionality 504 may be realized as a virtual function or virtual machine on a host hardware/software platform 502, e.g., in a network agent implementation, or in a premises gateway agent implementation. As described previously, a plurality of MABR gapped/segmented streams 505 comprising various bitrate representations of multicast service channels may be received by node 502 at corresponding multicast IP addresses, which may be changing on the fly depending on the IGMP Join/Leave operations. A segment cache 506 is provided wherein a plurality of segments corresponding to one or more active multicast service channels having potentially different bitrate qualities, e.g., as referenced by reference numerals 507-1 to 507-N, may be stored. A gap removal module 508 is operative in conjunction with a multicast streamer 510 to de-dap the gapped segments of a multicast service channel stream, and remux and multicast the service channel stream towards the premises gateway and ultimately to the client devices disposed therein on ports having suitably fixed multicast IP addresses that the receiving entities are aware of. A virtual pipe or stream bandwidth manager 518 that may be part of an overall bandwidth and policy management module 516 is operative in conjunction with the segment cache 506 to manage a subscriber premises bandwidth pipe or pipe portion allocated for multicast IPTV/video services. The virtual pipe and stream bandwidth manager 518 is also operative to effectuate channel/stream joining and leaving operations with respect to suitable bitrate representations of gapped service channel streams under IGMP Join and Leave operations 520 as well as dynamically updated policy management rules 524, including recording bandwidth management rules, and bitrate cap request notifications 528 from MABR bandwidth/QoS policy manager 128 as set forth above. By way of illustration, reference numerals 528-1 to 528-N refer to a plurality of bandwidth pipes for streams being provided to a subscriber premises for watching whereas reference numerals 530-1 to 530-K refer to a plurality of bandwidth pipes for streams being provided to one or more recording devices of the subscriber premises via a pipe 526.

One skilled in the art will recognize upon reference hereto that regardless of where an MVMA node is implemented (e.g., the network agent implementation of FIG. 1A or the gateway agent implementation of FIG. 1B), the overall functionality of apparatus 400A/400B in conjunction with MVMA functionality for joining an MABR stream having suitable bitrate representation for recording in an example MABR communications environment is broadly the same. Accordingly, various details concerning the foregoing general operations will be described below in an agnostic manner taking reference to the remaining drawing Figures, wherein the description is equally applicable to both network/VM agent and gateway agent implementations, mutatis mutandis.

Figure 6A:
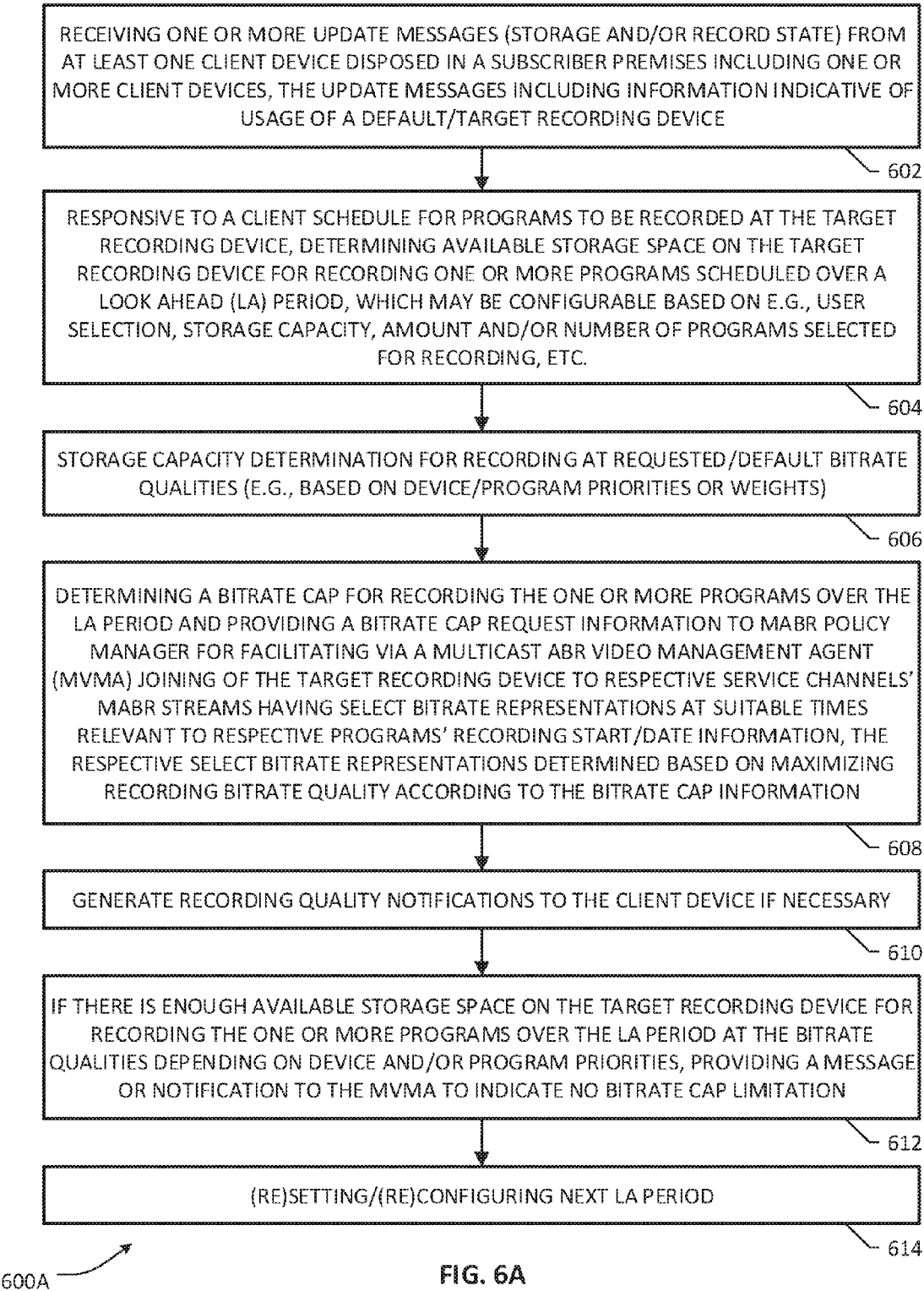
FIG. 6A depicts a flowchart of steps, blocks, acts and/or functions at least a subset of which may be combined in an example process for managing recording quality of program content and recording device space utilization in an MABR network according to one embodiment.

FIG. 6A depicts a flowchart 600A of steps, blocks, acts and/or functions wherein at least a subset of which may be combined and/or rearranged in a number of ways for managing recording quality of program content and recording device space utilization in an MABR network according to the teachings of the present patent application. At block 602, one or more update messages may be received by a DSO system from at least one client device disposed in a subscriber premises including one or more client devices, the one or more update messages including information indicative of usage of a default or target recording device of the subscriber premises (i.e., storage update messages) as well as record state update messages in a further embodiment (e.g., when a recording is started and when a recording is stopped) which involves determining how much storage space is used at the target/client recording device based on, inter alia, record state updates and bitrates of the programs recorded by the target/client device as will be set forth in further detail below. Regardless of how the storage use information or statistics is determined or obtained, responsive to a client schedule for programs to be recorded at the target or default recording device, a (further) determination may be made regarding available storage space on the target/default recording device for recording one or more programs scheduled over a Look Ahead (LA) period of the client recording schedule (block 604). In one arrangement, the LA period may be configurable based on various pieces of information, e.g., user selection, storage capacity, availability of additional recording devices, number of programs selected for recording, etc. In one variation, a storage capacity determination may be made whether there is sufficient storage space for recording the programs of the LA period at requested/default bitrate qualities (i.e., without needing any bitrate caps, e.g., based on device/program priorities or weights). That is, if the target/default recording device has enough free available space for recording the programs at bitrates greater than a bitrate cap (defined below), a request or message may be generated to an MVMA functionality via MABR bandwidth/QoS policy manager including an indication that no bitrate cap limits are needed for allocating a subscriber premises bandwidth pipe for recording the programs on the target/default recording device. These operations are exemplified in block 606 and 612. If there is insufficient storage capacity, a bitrate cap is determined with respect to recording the one or more programs over the LA period, which cap limitation may be provided as a bitrate cap request to the MABR policy manager for facilitating joining of the target recording device by the MVMA functionality to respective service channels' MABR streams having select bitrate representations at suitable times relevant to respective programs' recording start/date information, the respective select bitrate representations determined based on maximizing recording bitrate quality according to the bitrate cap information (block 608). As described hereinabove, service channels corresponding to the one or more programs selected for recording according to a client recording schedule may be multicast as a plurality of MABR streams, each MABR stream corresponding to a particular bitrate representation of the service channel based on the functionality of the network portions set forth previously. Further, appropriate notifications to the client device may be generated, if necessary, to indicate a warning with respect to lack of enough storage space, lowering of recording quality due to space constraints, and the like (block 610). In a further implementation, a next LA period may be (re)configured or (re)set for determining applicable bitrate cap information with respect to whatever programs scheduled for recording during that period (block 614).

Figure 6B:
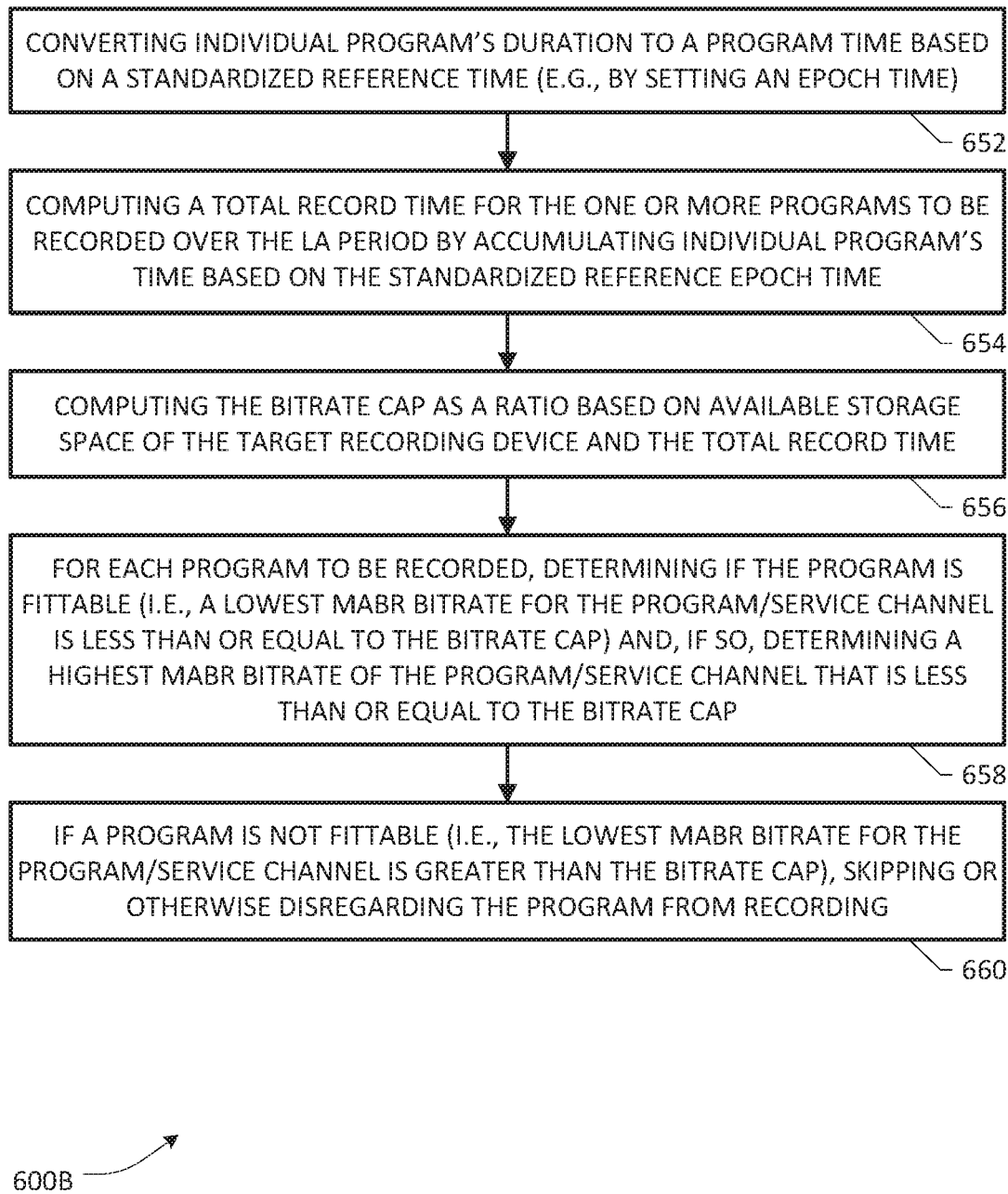
FIG. 6B depicts a flowchart of further acts, steps, functions and/or blocks that may take place in additional or alternative embodiments of the present invention.

FIG. 6B depicts a flowchart 600B of further acts, steps, functions and/or blocks that may take place in additional or alternative embodiments of the present invention, which blocks, steps, acts or functions may be combined and/or rearranged in a number of ways within an example process as set forth in the flowchart 600A of FIG. 6A. At block 652, an individual program's duration as specified in the client recording schedule may be converted to a program time based on a standardized reference time (e.g., by setting an epoch time). In one implementation, the epoch time may be configured as a system time that may be tracked or monitored to determine a length of time relative to a particular instant of time, e.g., in number of seconds elapsed since Time=00:00:00 UTC (Universal Time), for measuring program durations without having to be concerned about various factors such as local or regional time zone differences, Day Light Savings, and the like. It should be appreciated that by performing this standardization process, a more accurate determination of actual time durations of the programs in the client's recording schedule may be obtained. A total record time may be computed for the one or more programs of the recording schedule to be recorded over the LA period (e.g., a fraction of a day, a day, a week, etc.) by accumulating the individual programs' time durations based on the standardized epoch reference time (block 654). A bitrate cap may be determined, computed or otherwise obtained as a ratio based on available storage space of the recording device and the total record time (block 656). For each program to be recorded, a determination may be made if the program channel is "eligible" for recording within the recording device space constraints (i.e., "fittable" or "packable" in the subscriber premises bandwidth pipe for purposes of recording), e.g., by determining if a lowest MABR bitrate of the program's service channel provided by the MABR back office is less than or equal to the bitrate cap. In other words, if even the lowest MABR bitrate supported by the MABR back office for that channel is greater than the bitrate cap, it means that the available storage space of the recording device is not sufficient to record that program over the LA period. If the channel is packable, on the other hand, a further determination is made to obtain the highest MABR bitrate of the service channel that is less than or equal to the bitrate cap (e.g., for maximizing the bandwidth allocation for recording that channel). These foregoing acts are exemplified at block 658. In one arrangement, if a program is not packable, that service channel may be skipped or disregarded from recording, whereupon suitable notifications, alerts, etc. may be provided (block 660).

Figure 7:
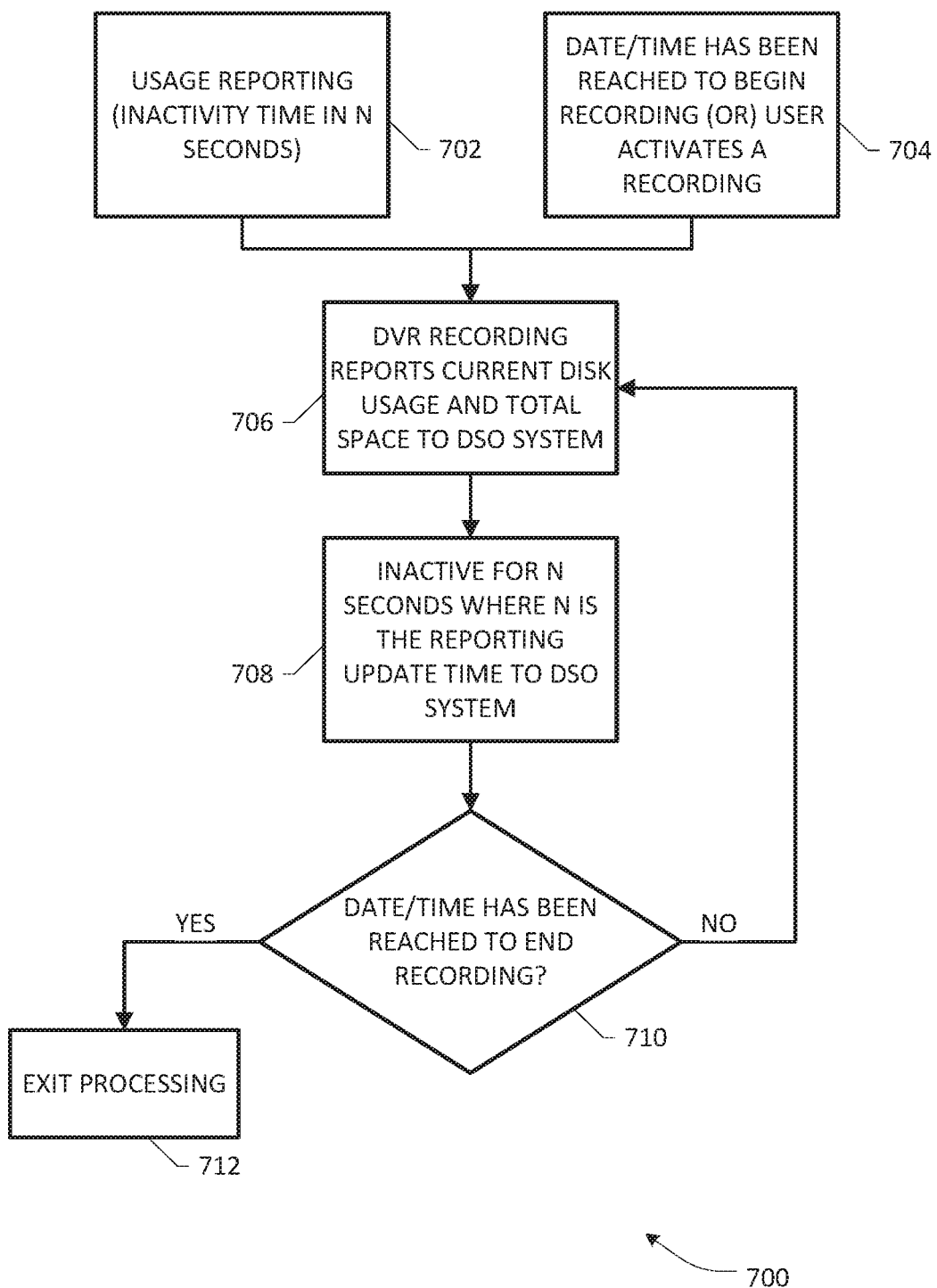
FIG. 7 depicts a flowchart of acts, steps, functions and/or blocks that may take place in an example embodiment of a process for reporting disk usage and/or storage update information for purposes of the present invention.

FIG. 7 depicts a flowchart of acts, steps, functions and/or blocks that may take place in an example embodiment of a process 700 for reporting disk usage and/or storage update information for purposes of the present invention, which may take place in conjunction with suitable messaging from a client device (e.g., an STB). In one embodiment, process 700 may be configured for providing a usage report while a storage device (e.g., a DVR) commences recording at a scheduled time. In another variation, process may be configured for providing the usage report while a storage device is recording or at the time when a user selects a record function at the recording device. Accordingly, appropriate input information or triggering events may be provided as part of process 700, wherein an inactivity or "sleep" time in "n" seconds in reporting usage (block 702) and scheduled/real-time recording activity (block 704) are illustratively indicated. At block 706, the recording device reports current disk usage and total space or capacity to a DSO subsystem (block 706). The reporting process enters a state of inactivity or sleep for a select period of time (n seconds) (block 708). Upon lapsing of the sleep time, a determination is made as to whether the recording is completed as set forth at block 710. If so, the reporting process is exited (block 712). Otherwise, the reporting process continues as indicated by the "NO" path returning to block 706. Accordingly, in one implementation of the process flow 700 of FIG. 7, appropriate usage reporting is provided in order to ensure that the DSO functionality of a MABR network has an accurate idea of how much space remains on the recording device(s) of a subscriber premises. It should be appreciated that this usage reporting flow may be avoided in an alternative/additional embodiment in which a predetermined file size is used for each recording.

In a still further embodiment, service logic executing at a DSO subsystem, e.g., DSO 122, may be configured to independently determine disk usage and/or storage update information, i.e., instead of the process set forth above. For example, once the service logic of DSO 122 is initially provided, e.g., as part of initialization setup, with information regarding the total disk space of the client recording device as well as its portion that is occupied, the service logic is operative to maintain a record of disk space usage, as it may be configured to receive notifications when a recording starts and when a recording stops (e.g., as set forth at block 602 of FIG. 6A). Further, DSO service logic may also be configured to receive updates from the MVMA functionality on which bitrate(s) the recording device is receiving the content for recording, since the bitrates can change while a recording is in process. Based on these inputs, the service logic operating at DSO 122 can determine the disk storage statistics with respect to the client/target recording device in question and use that statistics in further determinations as to applicable bitrate filters or limits for generating appropriate bitrate cap request messages as set forth herein.

Figure 8A:
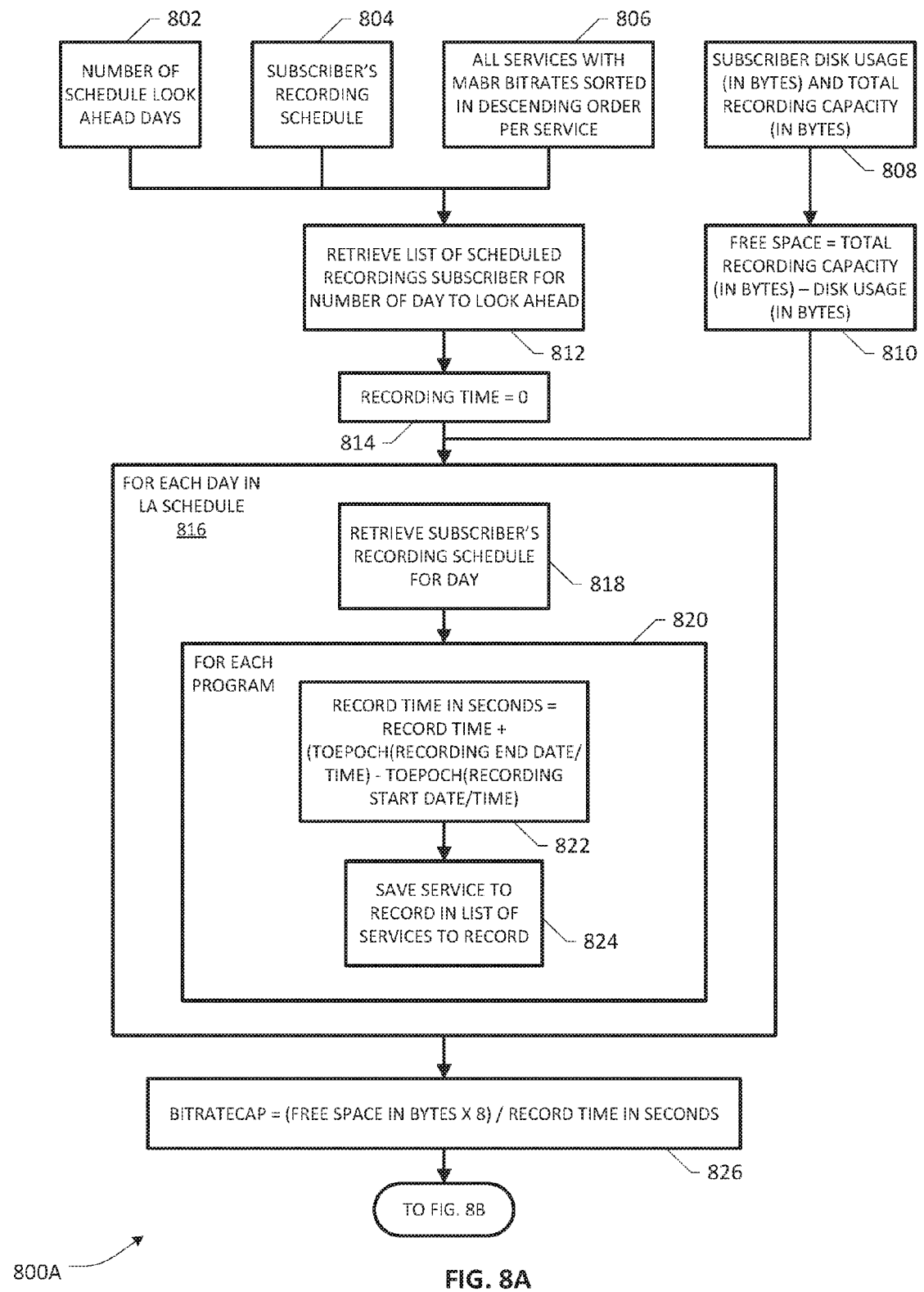
FIGS. 8A-8C depict flowcharts of further acts, steps, functions and/or blocks that may take place in additional or alternative embodiments of the present patent application.
Figure 8B:
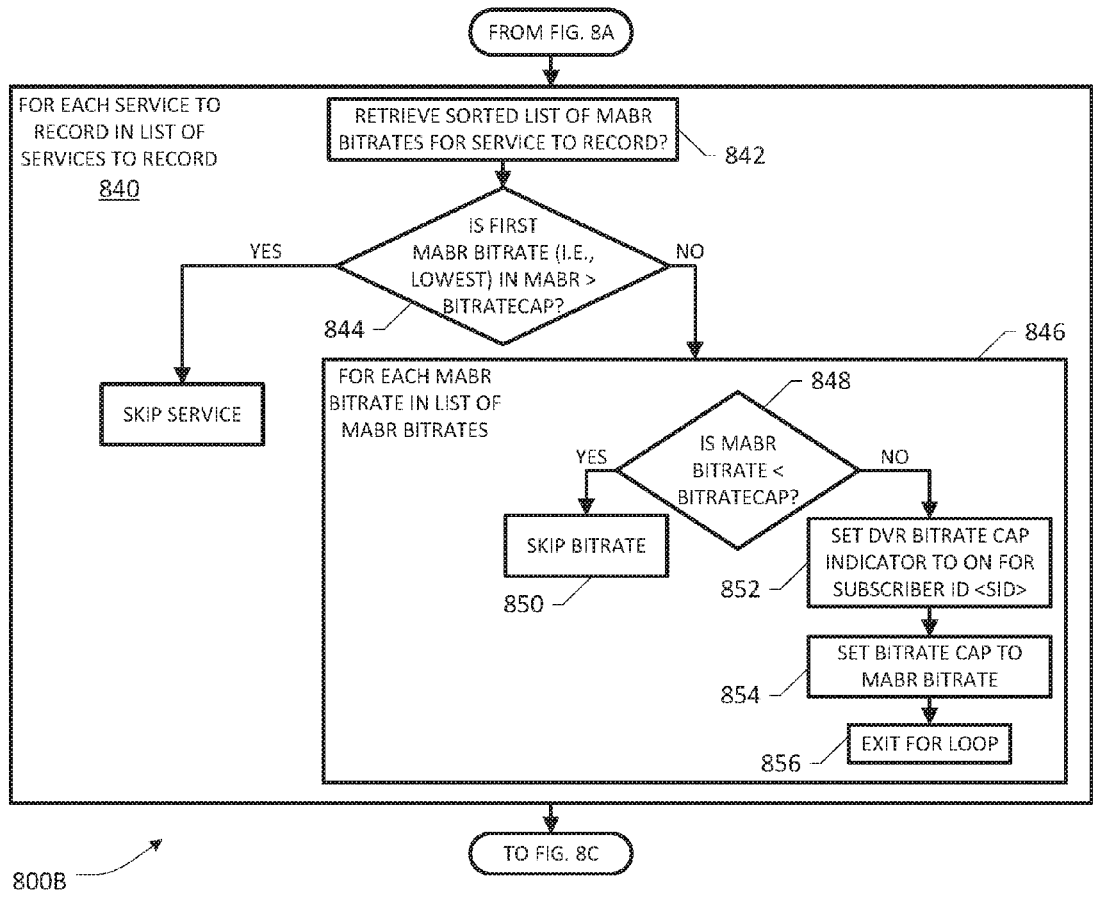
Figure 8C:
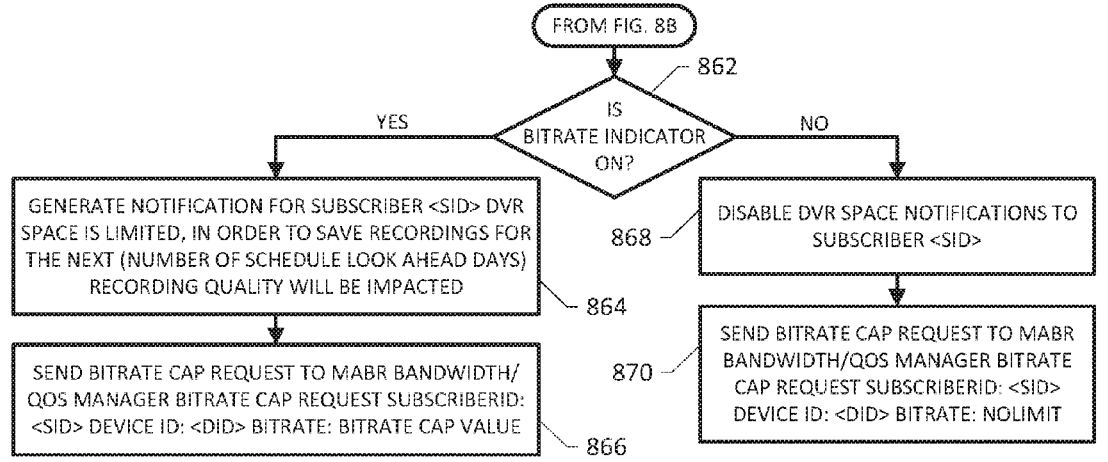

FIGS. 8A-8C depict flowcharts or portions thereof comprising further acts, steps, functions and/or blocks that may take place in additional or alternative embodiments of the present patent application, which blocks, steps, acts or functions may be combined and/or rearranged in a number of ways within an example process that may take place in conjunction with a DSO subsystem as set forth hereinabove. Broadly, in one embodiment, flowchart portions 800A-800C may be combined into a process for determining bitrate cap values with respect to the amount of recording to be done over a period of time vis-à-vis the amount of available disk space and modulating bandwidth allocations in accordance therewith. For instance, the service logic executing at an exemplary DSO system is operative to take the last known used vs. free disk space of a DVR in question, and compare it with recordings known about for the next X days. It determines how much disk space a recording schedule can have, and then uses this information to choose the best bitrate (without going over the limit). Should the bitrate cap be reduced compared to the maximum rate possible, a notification is sent to the subscriber (e.g., they may need to delete some of the programs on their DVR). Further, other network assets may also be notified of the cap as needed.

Turning to FIG. 8A, various pieces of input information may be provided as illustrated in the flowchart portion 800A regarding a configurable number of days in a schedule Look Ahead (LA) period (block 802), subscriber's recording schedule (block 804) (also referred to as a client recording schedule elsewhere in the present patent application), as well as all MABR services and respective bitrates ordered in a suitable order per service (e.g., descending order) (block 896). Subscriber disk usage and total capacity (also referred to as recording device's storage, e.g., in bytes) (block 808) may be provided for facilitating a determination of available free space as set forth at block 810. At blocks 812, 814, a list of scheduled recordings as set forth in the subscriber's recording schedule is retrieved and an epoch reference time is set. An iterative logic module or loop 816 is executed for each select portion of the LA period, e.g., per day, that involves retrieving the programs for the select portion (block 818) and executing another iterative logic module or sub-loop portion 820 with respect to each program of the select LA period for obtaining its record time based on the epoch reference timeframe (block 822) that is accumulated over all the programs to obtain a total record time in seconds and saving the service to a list of services to be recorded (block 824). Upon completion of the iterative logic block 816, a bitrate cap is determined by converting the total amount of free space in bytes to bits and dividing the total number of bits by the total record time in seconds (block 826).

Flowchart portion 800B shown in FIG. 8B receives the bitrate cap as an input to a nested loop or iterative logic block 840 that is performed for each service or program to record. One skilled in the art will recognize that for purposes of the embodiments herein, the terms "service" and "program" may be used somewhat interchangeably. At block 842, each service's MABR bitrates are retrieved, whereupon a determination is made if the service needs to be skipped. As described previously, this logic relates to whether a service is packable, e.g., by determining if the first MABR bitrate of the ordered list (i.e., the lowest bitrate) is greater than the bitrate cap (block 844). If so, the service is skipped (block 845). Otherwise, the logic determines that the service is eligible for recording and an optimum MABR bitrate may then be determined by performing another iterative process 846 with respect to each MABR bitrate for that service, e.g., by determining the highest MABR bitrate representation that is lower than the bitrate cap, as set forth at blocks 848 and 850, wherein a bitrate may be iteratively skipped. Upon determining the highest MABR bitrate pursuant to the decision logic of block 848, a bitrate cap indicator or flag (or other indicia) is set to "ON" for the subscriber (<sid>) (block 852). The highest possible MABR bitrate is set as the bitrate cap for purposes of bandwidth allocation (block 854), whereupon the iterative loop process 846 exits as set forth at block 856. In the event that the bitrate cap is higher than the highest MABR bitrate (e.g., a condition indicative of a large amount of free disk space available), there is no need to throttle or limit the bandwidth to be allocated for recording that service and accordingly no bitrate cap indicator may be set.

Flowchart portion 800C shown in FIG. 8C is operative responsive to the bitrate cap indicator input provided above. In the example implementation of FIG. 8C, if the bitrate cap indicator has been set (block 862), a suitable notification to the subscriber may be generated (block 864) and the bitrate cap value may be forwarded to the MABR bandwidth/QoS policy manager (block 866) for providing a bitrate update message to the MVMA node so as to modulate the bandwidth allocation process and facilitate joining of the correct bitrate representation of the service to the recording device as described hereinabove. On the other hand, where there is no bitrate cap indicator set, notifications to the subscriber concerning the disk usage or its constraints may be disabled (block 868), whereupon a suitable update message is generated to the MABR bandwidth/QoS policy manager for indicating that there is no bitrate limitation (block 870).

Figure 9:
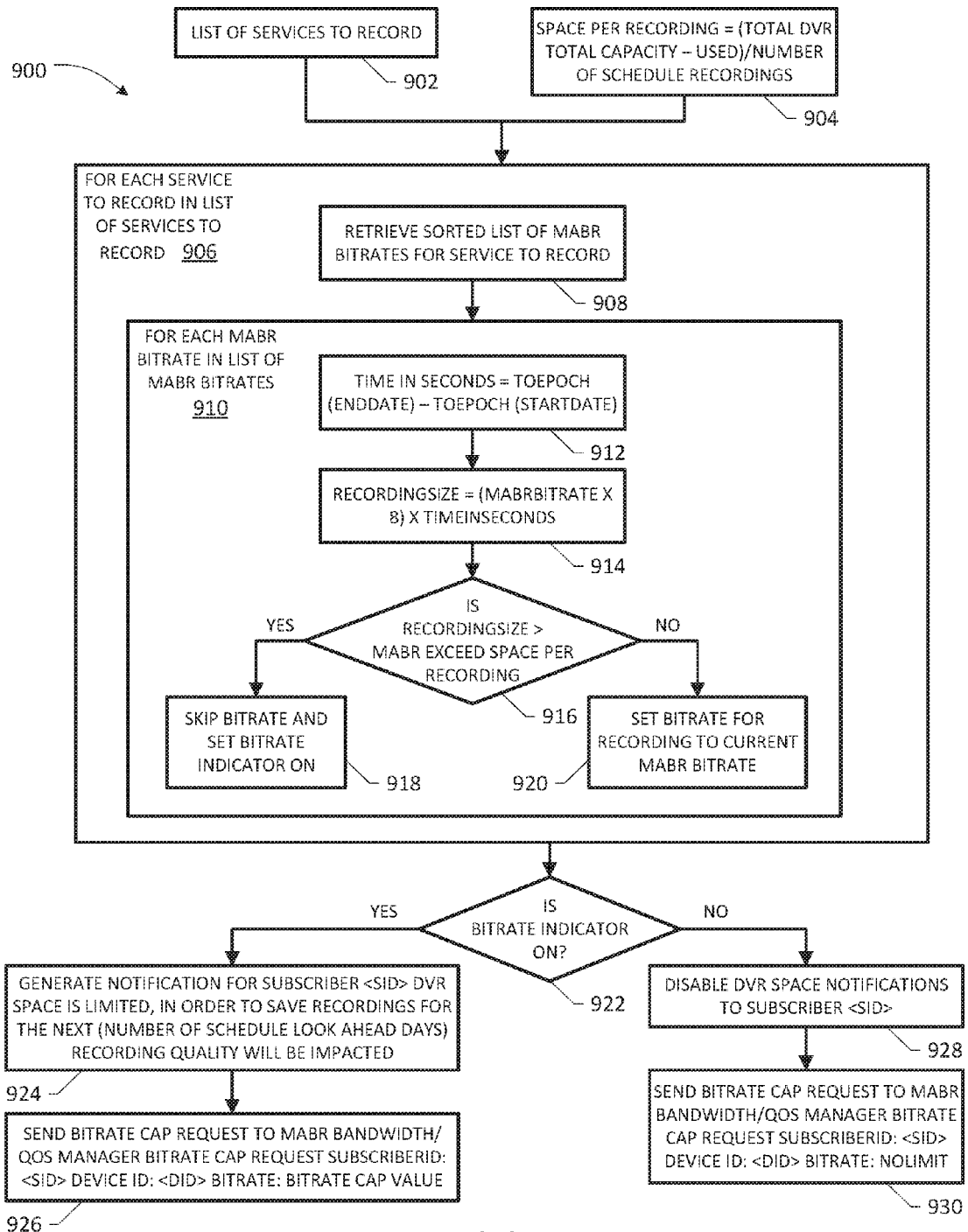
FIG. 9 depicts a flowchart of still further acts, steps, functions and/or blocks that may take place in additional or alternative embodiments of the present patent application.

FIG. 9 depicts a flowchart of another variation of a process 900 for obtaining or otherwise determining bitrate cap information is set forth where the required disk space is predetermined (e.g., a predetermined file size is used or each recording). At block 902, a list of services to be recorded is provided or received as an input. At block 904, required space per recording is determined based on the number of scheduled recordings. A nested iterative process or loop 906 is executed for each service to be recorded, which includes another iterative process or loop 910 for each of the MABR bitrates provided for each service. Similar to the process flow set forth in FIGS. 8A-8C, a sorted list of MABR bitrates for each service is retrieved (block 908). The inner iterative loop 910 also involves determining a total record time based on a standardized epoch reference time and a recording size based thereon (blocks 912, 914). Each of the MABR bitrates is compared against the recording size (block 916) in order to set a bitrate cap for recording and suitable bitrate cap indicator or flag (blocks 918, 920). Depending on the bitrate cap indicator information, suitable notifications may be generated to the subscriber (block 924) and bitrate cap request messages may be provided to the MABR bandwidth/QoS policy manager (926). If there is no bitrate cap indicator set (block 922), suitable disabling of notifications and MABR bandwidth/QoS policy messaging takes place as set forth at blocks 928, 930, similar to the functionalities described above with respect to FIG. 8C.

Figure 10:
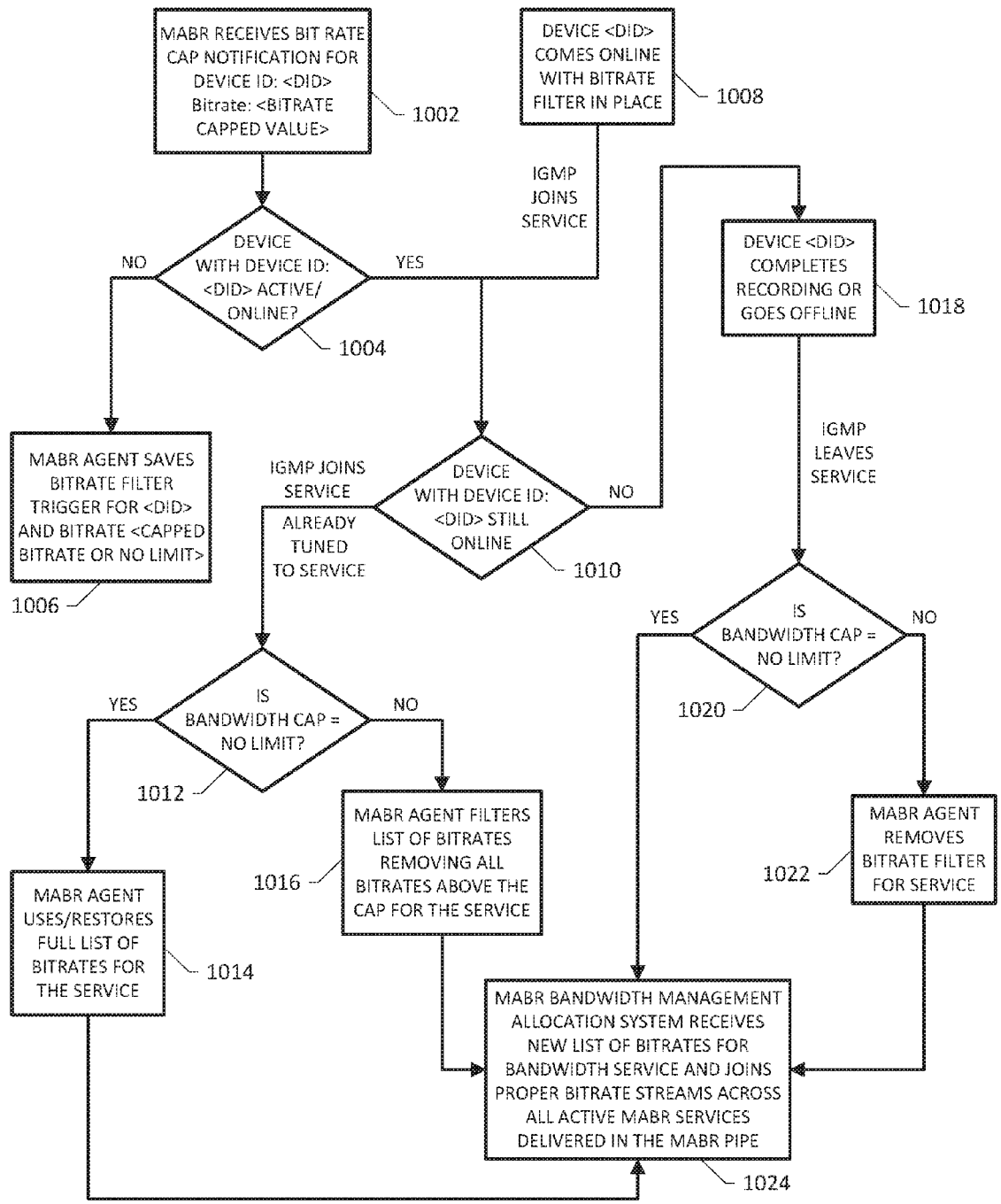
FIG. 10 depicts a flowchart of acts, steps, functions and/or blocks that may take place at a multicast ABR video management agent or element according to one embodiment.

Turning to FIG. 10, depicted therein is a flowchart 1000 with respect to various acts, steps, functions and/or blocks that may take place as part of MVMA functionality for facilitating cap-based MABR bitrate selection and managing bandwidth allocation accordingly in one example embodiment. At block 1002, the MVMA element receives a bitrate cap notification from the MABR bandwidth/QoS policy manager node for a particular recording device. If the recording device is not active or online (block 1004), the MVMA element saves the bitrate filter trigger for the device, along with an indication of whether there is a cap value or not (block 1006). If the recording device is already online or it comes online by appropriate IGMP operations (block 1008), a series of determinations may be made if it is still online and whether there is a bitrate cap limit applicable to bandwidth allocation (blocks 1010, 1012). If there is no limit, the MVMA element uses or restores a full list of MABR bitrates for the service (block 1014). Otherwise, it is determined that there is a bandwidth limitation based on the bitrate cap and the MVMA element filters the list of MABR bitrates to remove all bitrates above the cap for the service (block 1016). An MABR bandwidth management allocation functionality (e.g., similar to virtual pipe and stream bandwidth manager 518 illustrated in FIG. 5) receives the full list of bitrates (where there is no cap limitation) or a filtered list (where there is a cap limitation) for the service and facilitates joining of the appropriate bitrate representations across all active MABR services delivered via the subscriber premises bandwidth pipe (block 1024).

If the recording device completes recording the program on the service channel or goes offline (block 1018) by issuing suitable IGMP Leave operations, a determination may be made if a bitrate filter was effective for the service channel (block 1020). If so, the MVMA element removes the bitrate filter (block 1022), whereupon the MABR bandwidth management allocation functionality (re)allocates or (re)distributes the bandwidth across all active services by taking into account the release of the recording device, as set forth at block 1024. Likewise, even where there was no bitrate filter for the service channel, the MABR bandwidth management allocation functionality (re)allocates or (re)distributes the bandwidth across all active services upon the release of the recording device (block 1024).

It should be noted that at least some of the bandwidth allocation and/or reallocation operations as well as channel joining operations set forth above may take place using a number of "channel packing" techniques that may involve pipe modeling schemes based on various pieces of parametric information such as composite device priorities (CDP), inadequacy metrics (IM), and the like, potentially/preferably in conjunction with program recording priority levels, device priorities, as well as operator-, subscriber-, and/or content-based policy rules, or in any combination or subcombination thereof. In general, for example, a new channel may be added to the streaming bandwidth pipe based on inadequacy metrics used for selecting which streams are eligible for a bandwidth upgrade during annealing (i.e., iteratively changing bandwidth until no further optimal reallocation can be made). Basically, the inadequacy metric (IM) may be considered as a measure of how far out of balance an allocation to a stream is with regard to its priority and the priority of the other streams in a bandwidth pipe. In one example methodology, given a list of channels and the ABR bandwidths available for each channel, the channels are first sorted by their priority (or other parameters relating to channel weight). A select minimum bandwidth version of the channel is added to the pipe plan. If the channel's minimum bandwidth does not fit (i.e., the pipe is overbooked), then it does not go in the pipe plan and the process moves on to the next channel for further iterations to see how much of an upgrade can be made to the pipe plan. As the channels in the list are sorted by the inadequacy metric, the process can start with the most inadequate channel allocation for attempting to upgrade the bandwidth to the next highest available version of a channel. As pointed above, if the upgrade does not fit within the pipe, that upgrade is skipped and the scheme proceeds to the next most inadequate channel. One skilled in the art should realize that a further variation in optimization may be where channels whose upgrade is impossible, they can be removed from consideration for the rest of the annealing loop. Once a channel is selected for upgrade, the inadequacy metric is recomputed and the scheme restarts the annealing loop, which may be configured to end when no channels can be upgraded to fit into the bandwidth allocation of the bandwidth pipe. Likewise, a CDP-based channel packing may be employed in an annealing process involving MABR and/or UBAR video streams of the streaming video pipe serving a subscriber premises. Additional details with respect to bandwidth divider implementations (e.g., dividing the total streaming video pipe into a MABR portion and a UABR portion), as well as metrics-based stream management may be found in one or more of the following commonly owned U.S. patent application(s): (i) "UNICAST ABR STREAMING" (Ericsson Ref. No.: P43082-US1), application Ser. No. 14/246,920, filed Apr. 2, 2014, in the name(s) of Christopher Phillips et al., and (ii) MERGING MULTICAST ABR AND UNICAST ABR WITH PROGRESSIVE DOWNLOAD ABR IN A CUSTOMER PREMISES DEVICE WITHIN THE SAME VIDEO DELIVERY PIPE" (Ericsson Ref. No.: P43011-US1), application Ser. No. 14/246,880, filed Apr. 2, 2014, in the name(s) of Christopher Phillips et al., which are hereby incorporated by reference.

Figure 11A:
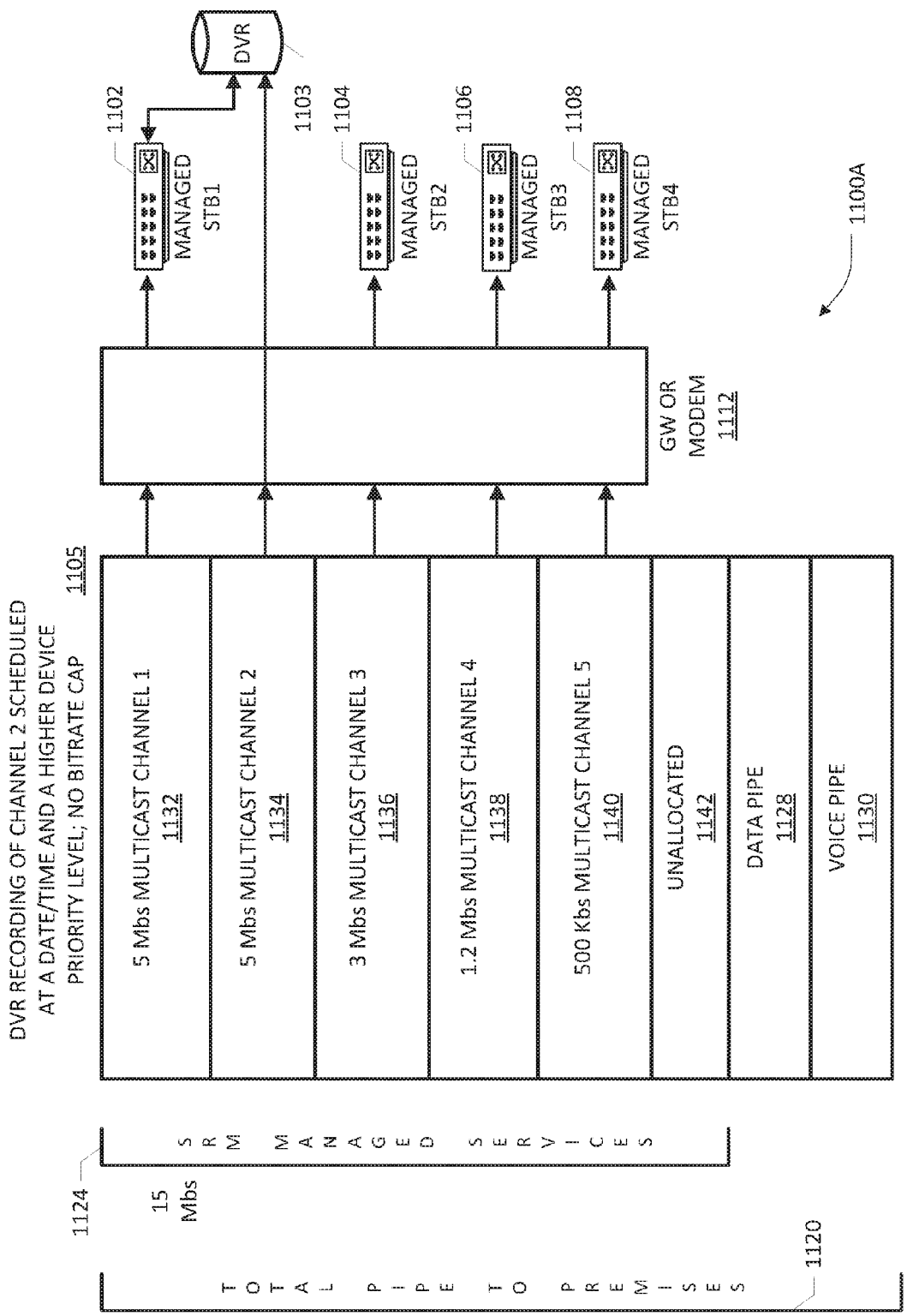
FIG. 11A depicts bandwidth allocation of a managed subscriber bandwidth pipe in one example scenario where there is no bitrate cap applied for recording a particular program according to an embodiment of the present invention.
Figure 11B:
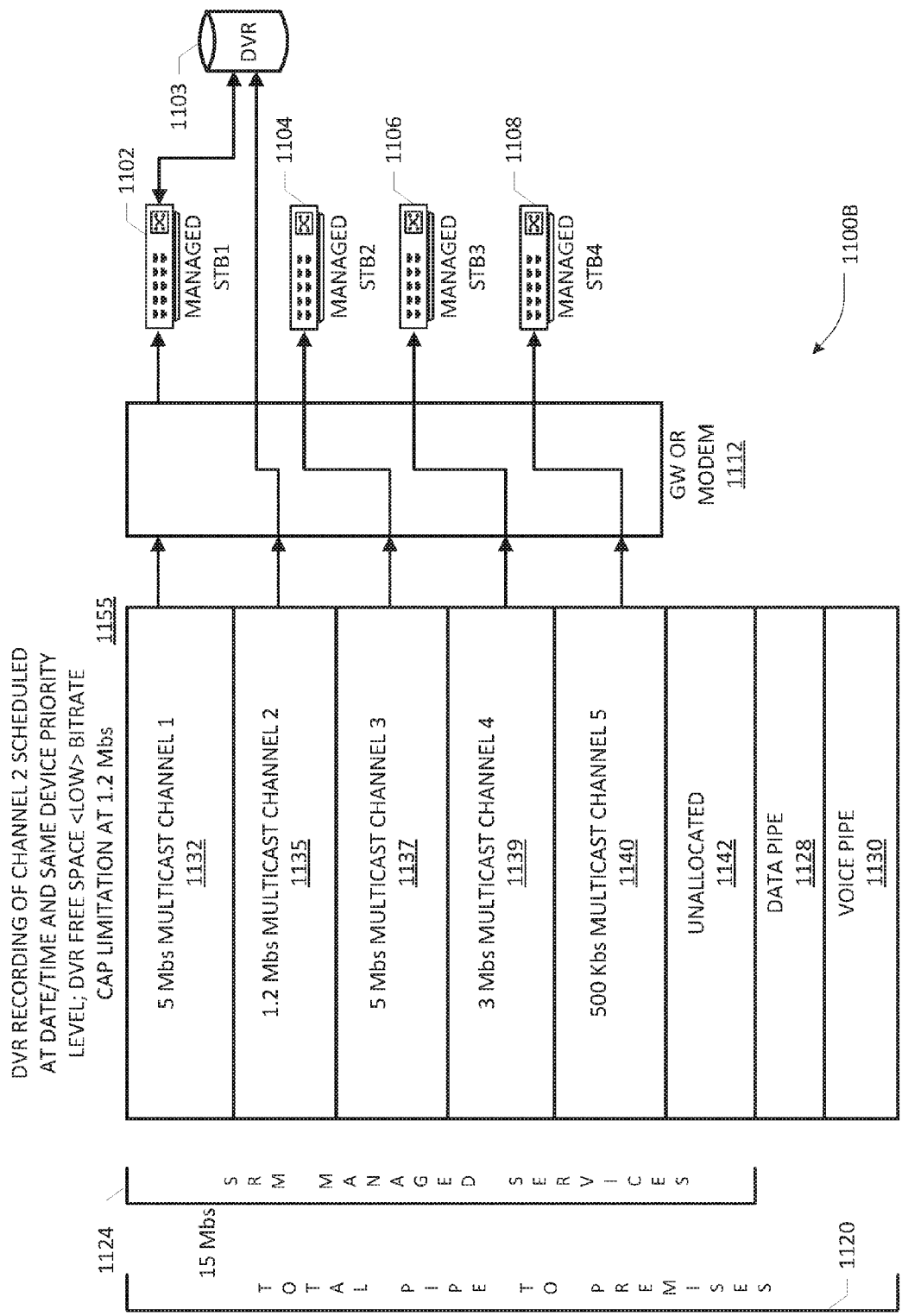
FIG. 11B depicts bandwidth allocation of a managed subscriber bandwidth pipe in one example scenario where a bitrate cap is applied with respect to recording a particular program according to an embodiment of the present invention.

Referring to FIGS. 11A and 11B, depicted therein are example bandwidth allocation scenarios with respect to a managed subscriber bandwidth pipe according to an embodiment of the present invention, wherein one example scenario 1100A involves bandwidth allocation for a high priority recording device with no bitrate cap limitation and another example scenario 1100B involves bandwidth allocation for the same recording device with a bitrate cap limitation. As illustrated in FIG. 11A, a total bandwidth pipe 1120 to a subscriber premises via premises node 1112 may include a data pipe 1128 and a voice pipe 1130, and may further comprise a managed video streaming pipe 1124 of 15 Mbs that is operative to serve five client devices, e.g., four STBs 1102, 1104, 1106, 1108 as well as a DVR device 1103 coupled to STB 1102, via five multicast channels as managed services provided under a Session Resource Management (SRM). Under a suitable bandwidth allocation scheme with no bitrate cap limitation (e.g., as provided in a bitrate cap request message 1105), Channel 1 of 5 Mbs 1132 is joined to STB 1102, which has a high priority (P1). In similar fashion, Channel 2 of 5 Mbs 1134 is joined to DVR 1103 associated with STB 1102 because of the high level priority and lack of a bitrate cap limitation (e.g., due to a large amount of free space being available on the DVR). Channel 3 of 3 Mbs 1136, Channel 4 of 1.2 Mbs 1138 and Channel 5 of 500 Kbs 1140 are respectively joined to STBs 1004, 1006 and 1008, responsive to the bandwidth allocation (e.g., based on the respective device priorities), leaving an unallocated portion 1142 (e.g., a portion having 300 Kbs).

A different bandwidth allocation scheme is seen in the scenario 1100B of FIG. 11B wherein a bitrate cap limitation is in effect (e.g., due to space constraints on the DVR), illustratively set at 1.2 Mbs for Channel 2, as provided in a bitrate cap request message 1155. As before, Channel 1 of 5 Mbs 1132 is joined to STB 1102 due it its high priority (P1). Although DVR 1103 is associated with high priority STB 1102, it is joined to Channel 2 at 1.2 Mbs 1135 due to the bitrate cap. Because of the reduced bandwidth allocation to Channel 2 in this scenario, allocations for Channel 3 and Channel 4 are readjusted or redistributed by increasing bandwidths and joining corresponding higher bitrate streams as indicated by a 5 Mbs portion 1137 for Channel 3 and a 3 Mbs portion 1139 for Channel 4, to which STB 1104 and STB 1106 are joined, respectively. By way of further illustration, STB 1108 remains joined to Channel 5 with no change in its bitrate stream, e.g., having 500 Kbs 1140, as before. Further, the unallocated portion 1142 is also maintained at the same amount in this illustrative scenario, although it is not necessary that it remains so.

Figure 12:
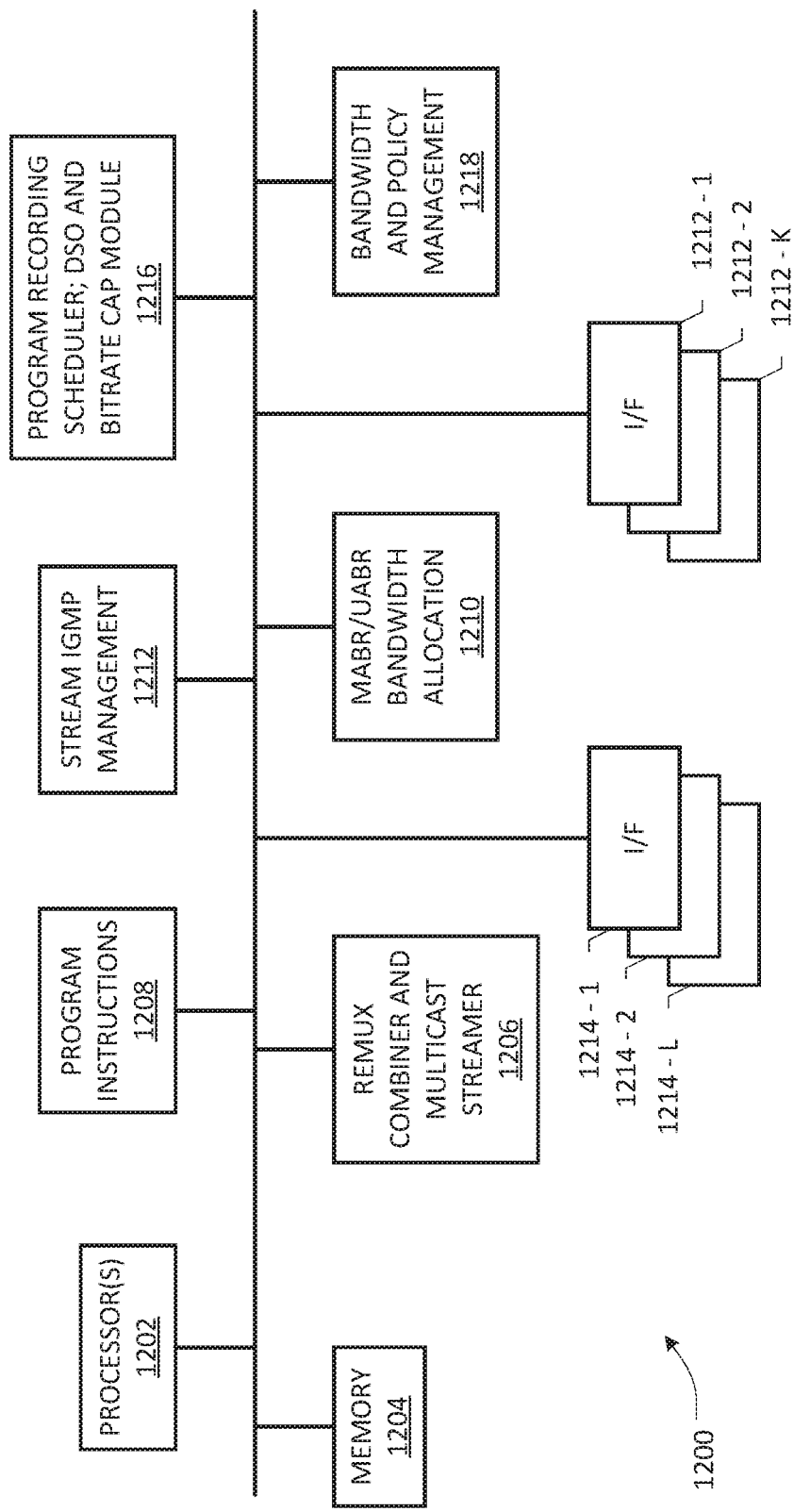
FIG. 12 depicts a block diagram of an example apparatus operative as a network node, element, or subsystem in an MABR communications network of FIG. 1A or FIG. 1B according to one or more embodiments of the present patent application.

FIG. 12 depicts a block diagram of an apparatus 1200 that may be selectively configured as a network node or subsystem operative in an MABR communications network of FIG. 1A or FIG. 1B according to an embodiment of the present patent application. For example, apparatus 1200 may be configured as MVMA functionality in a network agent or gateway agent implementation. One or more processors 1202 may be operatively coupled to various modules that may be implemented in persistent memory for executing suitable program instructions or code portions with respect to one or more processes set forth hereinabove for facilitating channel re-muxing, channel joining/leaving, de-gapping, and/or bandwidth allocations, etc., depending on a particular configuration. A stream IGMP management module 1212 is operative to perform various processes for generating appropriate signals to an IGMP switch or a premises gateway node for joining the requested channels subject to applicable bitrate cap limitations in accordance with the teachings set forth hereinabove. A remux combiner and multicast streamer 1206 is operative to de-gap and stitch the multicast channel streams for injecting into downstream communication paths at configured multicast addresses. A MABR bandwidth allocation module 1210 is operative to apply suitable bandwidth allocation policies to a subscriber premises pipe as necessary under suitable program instructions, e.g., program instructions 1208 and/or other code portions in memory 1204, or in conjunction with a bandwidth policy manager 1218 to effectuate stream selection and channel packing. A suitable segment cache (not specifically shown) may also be provided as part of the memory system of the apparatus 1200. Further, the arrangement shown in FIG. 12 may be (re)configured as a DVR recording scheduler/optimization node in certain embodiments, suitably modified as needed, by including a program scheduler and bitrate cap functionality (e.g., scheduler 1216) and deleting any non-required modules. In a still further arrangement, apparatus 1200 may also be (re)configured as a MABR bandwidth/QoS policy manager node having a suitable database such as database 454 (shown in FIG. 4B). Depending on the configuration, various network interfaces (I/F) 1214-1 to 1214-L may be appropriately provided with respect to effectuating communications with MABR bandwidth/QoS policy manager nodes, DVR recording/scheduler nodes, back office nodes, SAG units and/or MSF functionalities, Session Resource Management (SRM) nodes, IGMP switches, unicast switches, and the like. In similar fashion, interfaces 1212-1 to 1212-K are operative to effectuate communications with a plurality of STBs and other client devices (in a gateway agent implementation, for example) via a suitable premises network as set forth in FIG. 1B.

Figure 13:
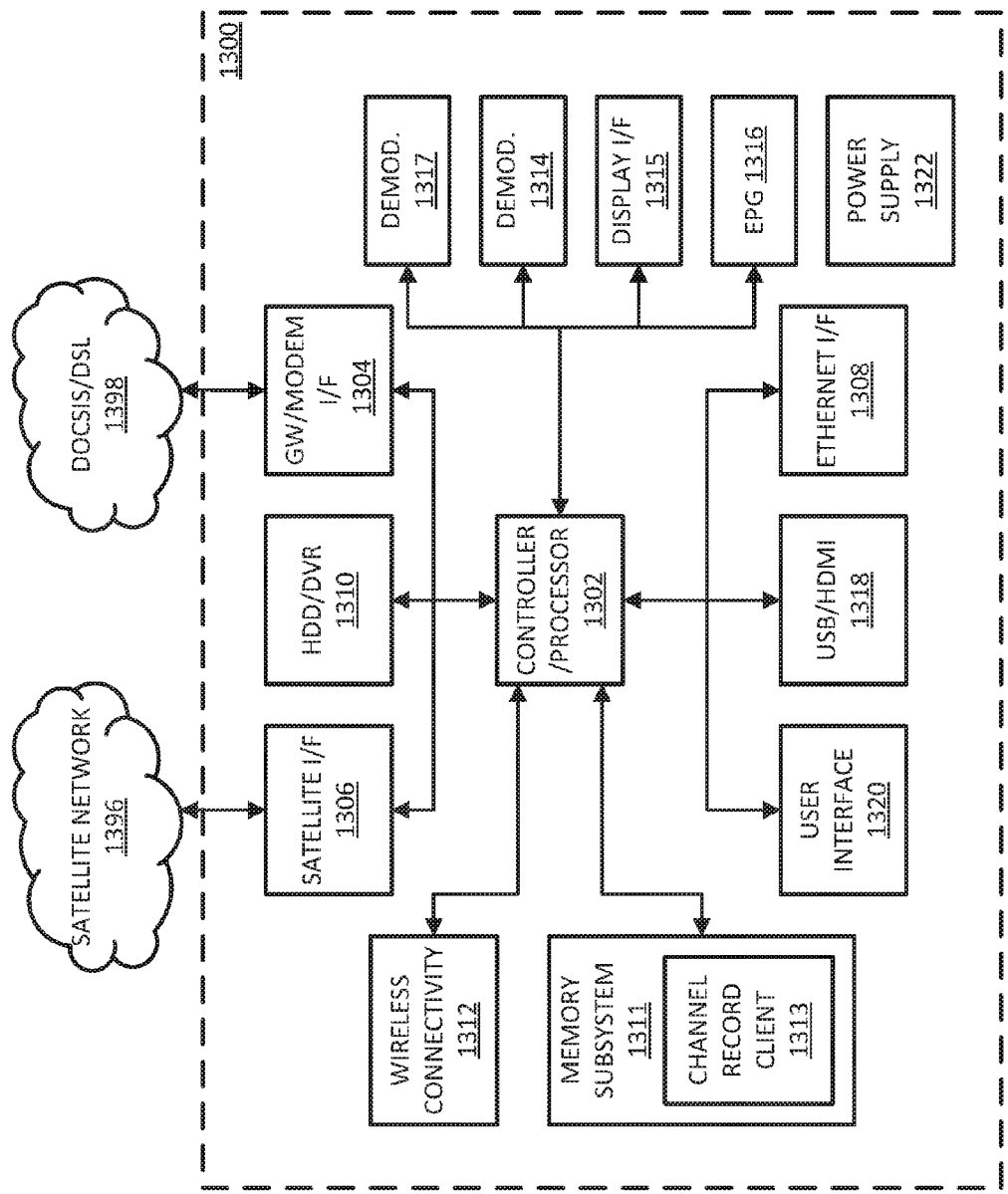
FIG. 13 depicts a block diagram of an example subscriber station (e.g., STB) according to an embodiment of the present patent application.

FIG. 13 depicts a block diagram of an example subscriber station (e.g., STB) 1300 according to an embodiment of the present patent application. STB 1300 is generally representative of a client device or subscriber station forming one of the plurality of devices 104-1 to 104-N shown in FIG. 1A or 1B, and may include appropriate hardware/software components and subsystems configured for performing any of the device-side processes (either individually or in any combination thereof) with respect to generating program recording requests and receiving appropriate responses and/or notifications described hereinabove. One or more microcontrollers/processors 1302 are provided for the overall control of the subscriber device 1300 and for the execution of various stored program instructions embodied in a persistent memory 1313 for operation as a multicast client including recording capability that may be part of a memory subsystem 1311 of the subscriber device 1300. Controller/processor complex referred to by reference numeral 1302 may also be representative of other specialty processing modules such as graphic processors, video processors, digital signal processors (DSPs), and the like, operating in association with suitable video and audio interfaces (not specifically shown). Appropriate interfaces such as I/F modules 1304 and 1306 involving or operating with tuners, demodulators, descramblers, MPEG/H.264/H.265 decoders/demuxes may be included for processing and interfacing with multicast IPTV and other content signals received via a DSL/CMTS network 1398 or a satellite network 1396. Example demodulators including NTSC demodulator 1314 and ATSC/PAL demodulator 1317, etc., may also be provided. Other I/O or interfaces such as a display interface 1315, EPG 1316 for identifying service channels, user interface or remote control interface 1320, USB/HDMI ports 1318, Ethernet I/F 1308, and short-range and wide area wireless connectivity interfaces 1312 are also provided. A hard disk drive (HDD) or DVR system 1310 may be included for mass storage of all sorts of program assets such as multicast content e.g., A/V media, TV shows, movie titles, multimedia games, etc. Also included in STB 1300 is a suitable power supply block 1322, which may include AC/DC power conversion to provide power for the device 1300. It should be appreciated that the actual power architecture for the subscriber device 1300 may vary by the hardware platform used, e.g., depending upon the core SoC (System on Chip), memory, analog front-end, analog signal chain components and interfaces used in the specific platform, and the like.

One skilled in the art will further recognize that various apparatuses, subsystems, functionalities/applications and/or one or more network elements as well as the underlying network infrastructures set forth above for facilitating recording of MABR content may be architected in a virtualized environment according to a network function virtualization (NFV) architecture in additional or alternative embodiments of the present patent disclosure. For instance, various physical resources, databases, services, applications and functions executing within an example network, e.g., network architectures or network portions shown in drawing Figures herein may be provided as virtual appliances, machines or functions, wherein the resources and applications are virtualized into suitable virtual network functions (VNFs) or virtual network elements (VNEs) via a suitable virtualization layer. Resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Furthermore, at least a portion of an example network architecture disclosed herein may be virtualized as set forth above and architected in a cloud-computing environment comprising a shared pool of configurable virtual resources. Various pieces of software, e.g., with respect to DVR recording scheduler/optimization, MABR back office and bandwidth/QoS policy management, MVMA functionality, IGMP functionality, etc., as well as platforms and infrastructure of an ABR network may be implemented in a service-oriented architecture, e.g., Software as a Service (SaaS), Platform as a Service (PaaS), infrastructure as a Service (IaaS), and the like, with multiple entities providing different features of an example embodiment of the present invention. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like.

Based upon the foregoing Detailed Description, it should be appreciated that one or more embodiments of the present disclosure can be advantageously implemented in a number of multicast environments to optimize recording bitrates based on space constraints. An embodiment is created that allows live content to be recorded in an MABR system while being able to correctly predict if there is enough file space available for a recording, which not only allows for an enhanced user experience but also enables recording of MABR content at an optimal quality in the first place. Furthermore, one or more embodiments may be practiced in conjunction with typical streaming technologies such as HLS, HDS, HSS, DASH, and the like.

In the above-description of various embodiments of the present disclosure, it is to be understood that the terminology used herein is for the purpose of describing particular embodiments only and is not intended to be limiting of the invention. Also, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method for managing recording quality in a multicast adaptive bitrate (MABR) communications network, the method comprising:
    receiving a plurality of encoded MABR streams for each service channel from an MABR encoder operative to process a plurality of service channels, wherein each encoded MABR stream corresponds to a particular bitrate representation of a specific service channel;
    generating a segmented and gapped MABR stream for each encoded MABR stream of each service channel;
    providing, by a digital video recorder (DVR) scheduler and optimization (DSO) element, program recording schedules to one or more client devices disposed in a subscriber premises, the program recording schedules comprising an electronic program guide showing a plurality of programs available on a set of MABR service channels serving the subscriber premises;
    receiving at least one of (i) one or more storage update messages from a client device disposed in the subscriber premises including one or more client devices, the one or more storage update messages including information indicative of usage of a target recording device disposed in the subscriber premises, and (ii) one or more record state messages from the client device disposed in the subscriber premises, the one or more record state messages including information indicative of when a recording on the target recording device starts and stops;
    configuring a user-selectable Look Ahead (LA) period responsive to a client schedule for programs to be recorded at the target recording device disposed in the subscriber premises including one or more client devices;
    determining available storage space on the target recording device for recording one or more programs scheduled over the Look Ahead (LA) period;
    responsive to the LA period and the available storage space, determining a bitrate cap for recording the one or more programs over the LA period and providing a bitrate cap request message to a multicast ABR policy manager to indicate whether a bitrate filter is applicable with respect to the one or more programs to be recorded at the target recording device;
    receiving, by the multicast ABR video management agent (MVMA), one or more management messages from the multicast ABR policy manager, the management messages including at least one of a bitrate filter indication information and a bandwidth policy information with respect to a subscriber premises bandwidth pipe serving the subscriber premises; and
    responsive to the one or more management messages, joining the target recording device, by the multicast ABR video management agent, to respective service channels corresponding to the one or more programs at select bitrate representations that maximize bitrate quality of recording of the one or more programs at the target recording device.

2. The method as recited in claim 1, wherein the select bitrate representations are joined to the target recording device at suitable times relevant to the one or more programs' respective recording start and date times indicated in program recording requests provided by the client device.

3. The method as recited in claim 1, further comprising:
    determining if the target recording device has a storage capacity sufficient for recording the one or more program programs at default bitrates greater than the bitrate cap; and
    if so, including an indication in the bitrate cap request that there is no bitrate cap limitation for recording the one or more programs at the target recording device.

4. The method as recited in claim 3, wherein the default bitrate qualities are determined based on a priority level assigned to at least one of the client device and the target recording device.

5. The method as recited in claim 1, wherein the select bitrate representations of the respective one or more programs are each allocated a corresponding portion of the subscriber premises bandwidth pipe servicing the subscriber premises based on channel packing according to the bitrate cap.

6. The method as recited in claim 1, wherein the programs to be recorded at the target recording device each comprises media content encoded using one of a Moving Pictures Expert Group (MPEG) codec, an MPEG-2 codec, an MPEG-4 codec, an H.264 codec, and an H.265 codec.

7. The method as recited in claim 1, wherein the client device comprises a set-top-box (STB) and the target recording device is integrated with the STB from which the one or more storage update messages and one or more program recording requests are generated.

8. The method as recited in claim 1, wherein the target recording device is a media storage device provided as part of a premises network comprising the one or more client devices disposed in the subscriber premises.

9. The method as recited in claim 1, wherein the determining of the bitrate cap comprises:
converting respective durations of the one or more programs to corresponding program times based on a standardized reference epoch time;
calculating a total record time for the one or more programs to be recorded over the LA period using the respective standardized reference epoch times; and
computing the bitrate cap as a ratio based on the available storage space on the target recording device and the total record time.

10. An apparatus for managing recording quality in a multicast adaptive bitrate (MABR) communications network, the apparatus comprising:
a segmentation and gapping (SAG) unit configured to receive a plurality of encoded MABR streams for each service channel from an MABR encoder operative to receive a plurality of service channels, wherein each encoded MABR stream corresponds to a particular bitrate representation of a specific service channel, the SAG unit further operative to generate a segmented and gapped MABR stream for each encoded MABR stream of each service channel;
a digital video recorder (DVR) scheduler and optimization (DSO) element configured to provide program recording schedules to a client device disposed in a subscriber premises including one or more client devices, the program recording schedules comprising an electronic program guide showing a plurality of programs available on a set of MABR service channels serving the subscriber premises, the DSO element further adapted to:
receive at least one of (i) one or more storage update messages from a client device disposed in a subscriber premises including one or more client devices, the one or more storage update messages including information indicative of usage of a target recording device disposed in the subscriber premises, and (ii) one or more record state messages from the client device disposed in the subscriber premises, the one or more record state messages including information indicative of when a recording on the target recording device starts and stops;
configure a user-selectable Look Ahead (LA) period responsive to a client schedule for programs to be recorded at the target recording device disposed in the subscriber premises including one or more devices;
determine available storage space on the target recording device for recording one or more programs scheduled over the Look Ahead (LA) period; and
responsive to the LA period and the available storage space, determine a bitrate cap for recording the one or more programs over the LA period and provide a bitrate cap request message to a multicast ABR policy manager to indicate whether a bitrate filter is applicable with respect to the one or more programs to be recorded at the target recording device; and
a multicast ABR video management agent (MVMA) operative to receive one or more messages from the multicast ABR policy manager, the one or more messages including at least one of the bitrate filter indication information and bandwidth policy information with respect to a subscriber premises bandwidth pipe serving the subscriber premises, and responsive thereto, the multicast ABR video management agent being configured to join the target recording device to respective service channels corresponding to the one or more programs at select bitrate representations that maximize bitrate quality of recording of the one or more programs at the target recording device.

11. The apparatus as recited in claim 10, wherein the multicast ABR video management agent is further configured to join the select bitrate representations to the target recording device at suitable times relevant to the one or more programs' respective recording start and date times indicated in program recording requests provided by the client device.

12. The apparatus as recited in claim 10, wherein the DSO element is further configured to:
determine if the target recording device has a storage capacity sufficient for recording the one or more program programs at default bitrates greater than the bitrate cap; and
if so, including an indication in the bitrate cap request that there is no bitrate cap limitation for recording the one or more programs at the target recording device.

13. The apparatus as recited in claim 10, wherein the multicast ABR video management agent is further configured to:
for each of the one or more programs to be recorded, receive a gapped MABR stream of the select bitrate representation of the program from the SAG unit and at a suitable time code reference point join the gapped MABR stream of the select bitrate representation; and
de-gap the joined gapped MABR stream of the select bitrate representation for transmission to the target recording device.

14. The apparatus as recited in claim 10, wherein the multicast ABR video management agent is configured to operate at a network node upstream from an Internet Group Management Protocol (IGMP) router of the MABR communications network.

15. The apparatus as recited in claim 10, wherein the multicast ABR video management agent is configured as a virtual machine operating on a platform disposed upstream from an Internet Group Management Protocol (IGMP) router of the MABR communications network.

16. The apparatus as recited in claim 10, wherein the multicast ABR video management agent is configured to operate at a premises node associated with the subscriber premises, the premises node comprising one of a Digital Subscriber Line (DSL) gateway and a Data Over Cable Service Interface Specification (DOCSIS)-compliant cable modem.

17. The apparatus as recited in claim 10, wherein the MABR encoder is operative to receive channel source feeds of media content encoded using one of a Moving Pictures Expert Group (MPEG) codec, an MPEG-2 codec, an MPEG-4 codec, an H.264 codec, and an H.265 codec.

18. The apparatus as recited in claim 10, wherein the DSO element is configured to determine the bitrate cap by performing:
   converting respective durations of the one or more programs to corresponding program times based on a standardized reference epoch time;
   calculating a total record time for the one or more programs to be recorded over the LA period using the respective standardized reference epoch times; and
   computing the bitrate cap as a ratio based on the available storage space on the target recording device and the total record time.

19. The apparatus as recited in claim 10, wherein the client device comprises a set-top-box (STB) and the target recording device is integrated with the STB from which the one or more storage update messages and one or more program recording requests are generated.

20. The apparatus as recited in claim 10, wherein the client device comprises a set-top-box (STB) and the target recording device is integrated with the STB from which the one or more record state messages and one or more program recording requests are generated.

21. The apparatus as recited in claim 10, wherein the target recording device is a media storage device provided as part of a premises network comprising the one or more client devices disposed in the subscriber premises.

\* \* \* \* \*